US012697717B1

(12) United States Patent

Huang et al.

(10) Patent No.: US 12,697,717 B1

(45) Date of Patent: Aug. 4, 2026

(54) INSTANCE-WISE, MULTI-MODAL, GRASP GENERATION SYSTEMS AND METHODS FOR ROBOTIC END OF ARM TOOLS

(71) Applicant: Amazon Technologies, Inc., Seattle, WA (US)

(72) Inventors: Zhe Huang, North Reading, MA (US); Fan Wang, Andover, MA (US); Jianying Shi, Tewksbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 351 days.

(21) Appl. No.: 18/186,444

(22) Filed: Mar. 20, 2023

(51) Int. Cl.
| | |
|---|---|
| *B25J 9/16* | (2006.01) |
| *G06T 7/11* | (2017.01) |
| *G06T 7/50* | (2017.01) |

(52) U.S. Cl.
CPC ............ B25J 9/1612 (2013.01); B25J 9/161 (2013.01); B25J 9/163 (2013.01); B25J 9/1697 (2013.01); G06T 7/11 (2017.01); G06T 7/50 (2017.01); *G06T 2207/10024* (2013.01); *G06T 2207/10028* (2013.01); *G06T 2207/20081* (2013.01); *G06T 2207/20084* (2013.01)

(58) Field of Classification Search
CPC . B25J 9/1612; B25J 9/161; B25J 9/163; B25J 9/1697; G06T 7/11; G06T 7/50; G06T 2207/10024; G06T 2207/10028; G06T 2207/20081; G06T 2207/20084
See application file for complete search history.

(56) References Cited

U.S. PATENT DOCUMENTS

| | | | | |
|---|---|---|---|---|
| 2016/0279791 A1* | 9/2016 | Watanabe | .............. | G06V 20/64 |
| 2021/0101286 A1* | 4/2021 | Lee | .......... | B25J 13/08 |
| 2021/0138655 A1* | 5/2021 | Mousavian | .............. | G06T 7/70 |
| 2022/0016765 A1* | 1/2022 | Ku | .......... | B25J 9/1612 |
| 2022/0016767 A1* | 1/2022 | Ku | .......... | B25J 9/1697 |
| 2022/0410381 A1* | 12/2022 | Stoppi | ....... | G06T 7/50 |
| 2023/0136860 A1* | 5/2023 | Wang | ........ | B60W 30/09 |
| | | | | 345/419 |

OTHER PUBLICATIONS

Asif, Umar, Jianbin Tang, and Stefan Harrer. "Densely Supervised Grasp Detector (DSGD)." Proceedings of the AAAI Conference on Artificial Intelligence. vol. 33. No. 01. pp. 8085-8093, 2019. URL: https://ojs.aaai.org/index.php/AAAI/article/view/4816.
Github, Inc., "AdaGrasp: Learning an Adaptive Gripper-Aware Grasping Policy," www.github.com, Copyright 2023 GitHub, Inc., accessed Feb. 17, 2023, URL: https://github.com/columbia-ai-robotics/adagrasp.

(Continued)

*Primary Examiner* — Adam R Mott
*Assistant Examiner* — Sagar KC
(74) *Attorney, Agent, or Firm* — Athorus, PLLC

(57) ABSTRACT

Instance-wise, multi-modal, grasp generation systems and methods may process imaging data and depth data of items in order to generate item grasping data. For example, imaging data and depth data may be processed to isolate single items or instances as instance data. Then, the instance data may be processed using heuristic and/or learning modules. Further, the modules may generate item grasping data as outputs, including grasp modes, grasp positions, and/or grasp orientations.

17 Claims, 16 Drawing Sheets

(56)        References Cited

OTHER PUBLICATIONS

Gou, Minghao, et al. "RGB Matters: Learning 7-DoF Grasp Poses on Monocular RGBD Images." 2021 IEEE International Conference on Robotics and Automation (ICRA). IEEE, 2021, Mar. 3, 2021, URL: https://arxiv.org/abs/2103.02184, pp. 13459-13466.

Graspnet, "GraspNet," www.graspnet.net, Copyright 2021 Machine Vision and Intelligence Group, Shanghai Jiao Tong University, accessed Feb. 17, 2023, URL: https://graspnet.net/index.html.

Han, Mingshuo, et al. "Object-Agnostic Suction Grasp Affordance Detection in Dense Cluster Using Self-Supervised Learning.docx." arXiv preprint arXiv:1906.02995 (2019). URL: https://arxiv.org/abs/1906.02995, 6 pages.

Hasegawa, Shun, et al. "GraspFusion: Realizing Complex Motion by Learning and Fusing Grasp Modalities with Instance Segmentation." 2019 International Conference on Robotics and Automation (ICRA). (pp. 7235-7241) IEEE, 2019.

Jacquard.LIRIS.CNRS.FR, "Jacquard Dataset: A Large-Scale Dataset for Robotic Grasp Detection," jacquard.liris.cnrs.fr, LIRIS, Siléane Robotique & Vision and Ecole Centrale de Lyon through the Fui Pikaflex project and in part by the French National Research Agency (l'Agence Nationale de la Recherche (ANR)), through the ARES labcom project under grant Anr 16-LCV2-0012-01, accessed Feb. 17, 2023, URL: https://jacquard.liris.cnrs.fr/.

Kaggle Inc., "comell_grasp: cornell grasp dataset," www.kaggle.com, Kaggle Inc., accessed on Feb. 17, 2023, URL: https://www.kaggle.com/datasets/oneoneliu/cornell-grasp.

Mahler, Jeffrey, et al. "Dex-Net 2.0: Deep Learning to Plan Robust Grasps with Synthetic Point Clouds and Analytic Grasp Metrics." arXiv preprint arXiv:1703.09312 (2017), Aug. 8, 2017, URL: https://arxiv.org/abs/1703.09312, 12 pages.

Morrison, Douglas, Peter Corke, and Jurgen Leitner. "Closing the Loop for Robotic Grasping: A Real-Time, Generative Grasp Synthesis Approach." arXiv preprint arXiv:1804.05172 (2018), May 15, 2018, URL: https://arxiv.org/abs/1804.05172, 10 pages.

Mousavian, Arsalan, Clemens Eppner, and Dieter Fox. "6-DOF GraspNet: Variational Grasp Generation for Object Manipulation." Proceedings of the IEEE/CVF International Conference on Computer Vision. 2019. URL: https://openaccess.thecvf.com/content_ICCV_2019/papers/Mousavian_6-DOF_GraspNet_Variational_Grasp_Generation_for_Object_Manipulation_ICCV_2019_paper.pdf, 10 pages.

Qi, Charles Ruizhongtai, et al. "Pointnet++: Deep Hierarchical Feature Learning on Point Sets in a Metric Space." Advances in Neural Information Processing Systems 30 (2017).

Redmon, Joseph, and Anelia Angelova. "Real-Time Grasp Detection Using Convolutional Neural Networks." 2015 EEE International Conference on Robotics and Automation (ICRA). IEEE, 2015, Feb. 28, 2015, URL: https://arxiv.org/abs/1412.3128, pp. 1316-1322.

Shao, Lin, et al. "Unigrasp: Learning a Unified Model to Grasp with Multifingered Robotic Hands." IEEE Robotics and Automation Letters 5.2 (2020): 2286-2293. Sep. 7, 2020. URL: https://arxiv.org/abs/1910.10900.

Shao, Quanquan, et al. "Suction Grasp Region Prediction Using Self-supervised Learning for Object Picking in Dense Clutter." 2019 IEEE 5th International Conference on Mechatronics System and Robots (ICMSR). pp. 7-12. IEEE, 2019, URL: https://arxiv.org/abs/1904.07402.

Wang, Zhongkui, Keung Or, and Shinichi Hirai. "A Dual-Mode Soft Gripper for Food Packaging." Robotics and Autonomous Systems 125 (2020): 103427, 9 pages.

Xu, Zhenjia, et al. "AdaGrasp: Learning an Adaptive Gripper-Aware Grasping Policy." 2021 IEEE International Conference on Robotics and Automation (ICRA). (pp. 4620-4626) IEEE, 2021. Mar. 14, 2021. URL: https://arxiv.org/abs/2011.14206.

Zeng, Andy, et al. "Robotic Pick-and-Place of Novel Objects in Clutter with Multi-Affordance Grasping and Cross-Domain Image Matching." The International Journal of Robotics Research 41.7 (2022): 690-705. URL: https://journals.sagepub.com/doi/pdf/10.1177/0278364919868017.

* cited by examiner

500

SCENE POINT CLOUD WITH INSTANCE MASK VALUES

419

ISOLATED INSTANCE POINT CLOUD

420

INPUT: SCENE POINT CLOUD

310

INPUT: SCENE RGB IMAGE

308

INPUT: INSTANCE SEGMENTATION

318

1400A

1347

INSTANCE VOXEL
ENCODER

MODE
CLASSIFIER

POSITION
DECODER

ORIENTATION
DECODER

1352

1354

1356

INSTANCE-WISE, MULTI-MODAL, GRASP GENERATION SYSTEMS AND METHODS FOR ROBOTIC END OF ARM TOOLS

BACKGROUND

Many companies may store, package, and ship items and/or groups of items from material handling facilities. For example, many companies may store items in a material handling facility and ship items to various destinations (e.g., customers, stores) from the material handling facility. Various material handling systems and processes may pick and pack items for storage, sortation, or delivery. However, conventional automated item picking systems and methods may not reliably grasp a wide variety of items. Accordingly, there is a need for systems and methods to generate instance-wise, multi-modal, item grasping data to reliably and efficiently pick a wide variety of items in an automated manner.

DETAILED DESCRIPTION

Figure 1:
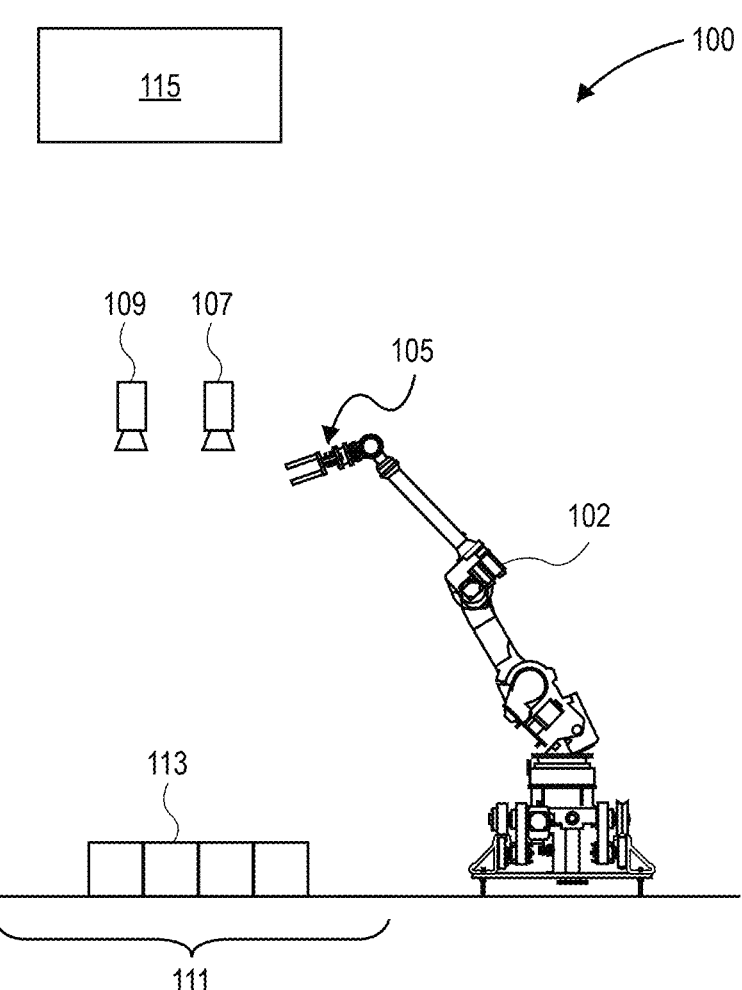
FIG. 1 is a schematic diagram of an example automated item picking system, in accordance with implementations of the present disclosure.

As is set forth in greater detail below, implementations of the present disclosure are directed to automated, instance-wise, multi-modal grasp generation systems and methods to generate item grasping data that facilitates reliable and efficient grasping of a wide variety of items by robotic arms and associated end of arm tools.

In example embodiments, the instance-wise, multi-modal, grasp generation systems and methods may comprise a robotic arm or other automated item grasping/picking system, machine, or device having an associated end of arm tool, at least one imaging device, camera, or sensor, at least one ranging or depth sensor, and a control system having one or more processors, memories, controllers, and various models or algorithms to process the imaging and depth data to generate item grasping data.

The various types of items may include grocery items, such as boxes, packages, bags, bottles, jugs, jars, cans, vegetables, fruits, packaged meats, or others, as well as various other types of items, such as books, electronics, housewares, clothing, or others, that may be picked, sorted, packed, and/or stored into one or more boxes, totes, crates, bags, or other containers. In addition, the various item attributes may include size, shape, dimensions, surfaces, edges, corners, volumes, weights, materials, friction coefficients, centers of gravity, moments of inertia, or other attributes.

In some example embodiments, the imaging data and depth data of one or more items may be captured by various sensors. In addition, the imaging and depth data may be processed to isolate a single item or single instance, in order to then perform single item- or instance-based grasp generation. Further, the single item or instance data may be processed using a heuristic module, which may include a set of rules and/or decisions based on attributes of a single item detected within the imaging and depth data. The heuristic module may then generate output including various item grasping data, such as a grasp mode, a grasp position, and/or a grasp orientation for the single item.

In additional example embodiments, the imaging data and depth data of one or more items may be captured by various sensors. In addition, the imaging and depth data may be processed to isolate a single item or single instance, in order to then perform single item- or instance-based grasp generation. Further, the single item or instance data may be processed using a learning module, such as one or more convolutional neural networks or other machine learning models including an instance voxel encoder, a mode classifier, a position decoder, and an orientation decoder, each of which may include one or more layers that have been trained on various aspects of items detected within the imaging and depth data. The learning module may also generate output including various item grasping data, such as a grasp mode, a grasp position, and/or a grasp orientation for the single item.

In further example embodiments, portions of the item grasping data may be generated using the heuristic module, while other portions of the item grasping data may be generated using the learning module. In one example implementation, a grasp mode may be generated using the learning module, and then, based at least in part on the selected grasp mode, a grasp position and/or grasp orientation may be generated using the heuristic module. Various other combinations of the heuristic modules and learning modules described herein may be used to generate various portions of the item grasping data for individual items.

Based on the generated item grasping data, a robotic arm or other automated item grasping/picking system, machine, or device having an associated end of arm tool may then reliably and efficiently pick or grasp individual items for sortation, packing, storage, delivery, and/or other downstream processes.

FIG. 1 is a schematic diagram 100 of an example automated item picking system, in accordance with implementations of the present disclosure.

As shown in FIG. 1, the example automated item picking system may comprise a robotic arm 102 having one or more associated end of arm tools 105, one or more imaging devices 107, one or more depth sensors 109, one or more picking areas or containers 111 including one or more items 113, and a control system 115.

The robotic arm 102 may comprise a six-axis robotic arm, a robotic arm having one or more articulated joints, a robotic arm coupled to a gantry system, or other automated, robotic item grasping/picking systems, machines, or devices. In addition, the robotic arm 102 may be coupled to and move or manipulate one or more associated end of arm tools 105. The end of arm tool 105 may comprise various types of end effectors to grasp or pick items, such as grasping fingers, pinching portions, suction cups, or other types or combinations of end effectors.

In some example embodiments described herein, the end of arm tool 105 may comprise a suction cup with a plurality of pinching portions, e.g., four independently actuatable pinching portions, to facilitate various different grasp modes. For example, the different grasp modes may comprise a flat mode in which the suction cup is actuated for flat suction, a full pinch mode in which the suction cup is actuated and all four pinching portions are actuated for pinching around an entire periphery, a small cup mode in which all four pinching portions are actuated and the suction cup is actuated, and a parallel pinch mode in which the suction cup is actuated and two opposing pinching portions are actuated. Additional details of an example end of arm tool 105 and corresponding grasp modes are described herein at least with respect to FIGS. 2A-2D.

Various other end of arm tools having different end effectors may be utilized with the instance-wise, multimodal, grasp generation systems and methods described herein. In addition, other end of arm tools may comprise various different grasp modes, including different types, numbers, configurations, or combinations of grasp modes, such as grasping, pinching, suction, pushing, pulling, lifting, enveloping, or others.

The imaging device 107 may comprise color, red-green-blue (RGB), or other types of imaging devices, cameras, or sensors. The imaging device 107 may be positioned overhead or above the picking area or container 111, and oriented to capture imaging data from an overhead or top-down perspective of the one or more items 113 in the picking area 111. The imaging data may comprise color imaging data, RGB imaging data, or other types of imaging data.

The depth sensor 109 may comprise stereo camera or sensor systems, active depth sensors, or other types of depth or ranging devices, cameras, or sensors. The depth sensor 109 may also be positioned overhead or above the picking area or container 111, and oriented to capture depth data from an overhead or top-down perspective of the one or more items 113 in the picking area 111. The depth data may comprise distance, range, or other types of depth data. Further, the imaging devices 107 and depth sensors 109 may be calibrated to capture imaging data and depth data from substantially similar perspectives or the same perspective, such that the imaging data and depth data may be processed together to generate instance data, as further described herein.

The picking area or container 111 may comprise a platform, region, surface, robotic drive unit, or other area upon which one or more items 113 may be positioned for grasping/picking, and/or the picking area or container 111 may comprise a pallet, crate, tote, box, bin, plate, or other container on or within which one or more items 113 may be positioned for grasping/picking. The items 113 may comprise various types of items, including grocery items, such as boxes, packages, bags, bottles, jugs, jars, cans, vegetables, fruits, packaged meats, or others, as well as various other types of items, such as books, electronics, housewares, clothing, or others. In addition, the items 113 may have various item attributes including size, shape, dimensions, surfaces, edges, corners, volumes, weights, materials, friction coefficients, centers of gravity, moments of inertia, or other attributes.

The control system 115 may comprise one or more processors, memories, controllers, and various models or algorithms to process the imaging data and depth data to generate item grasping data. As further described herein, the control system 115 may process the imaging and depth data to generate instance data associated with a single item, or single instance, among a plurality of items 113 captured within the imaging and depth data by the imaging device 107 and depth sensor 109. Then, the control system 115 may process the instance data using a heuristic module and/or a learning module to generate output including various item grasping data, such as a grasp mode, a grasp position, and/or a grasp orientation for the single item or instance. Further details of the control system 115 are described herein at least with respect to FIG. 15.

Although FIG. 1 illustrates a particular number, type, configuration, or arrangement of components of an example automated item picking system, other example embodiments may include other numbers, types, configurations, or arrangements of components of the example automated item picking system. For example, the robotic arm may have other sizes, shapes, or configurations, the end of arm tool may comprise various different types of end effectors and associated grasp modes, the imaging device may comprise various numbers, types, or configurations of imaging devices, the depth sensor may comprise various numbers, types, or configurations of depth sensors, and/or the picking area or container may have various other positions or orientations relative to the robotic arm, end of arm tool, imaging device, and/or depth sensor.

FIGS. 2A-2D are schematic diagrams 200A, 200B, 200C, 200D of example grasp modes for a robotic end of arm tool, in accordance with implementations of the present disclosure.

As shown in FIGS. 2A-2D, an example end of arm tool 205 may be coupled to a robotic arm (not shown) for movement and/or manipulation. The end of arm tool 205 may be similar to the end of arm tool 105 described herein at least with respect to FIG. 1, and FIGS. 2A-2D illustrate an end view of the end of arm tool 205, e.g., oriented directly toward grasping pinching, or suction surfaces or portions of the end of arm tool 205.

In the example embodiment of FIGS. 2A-2D, the end of arm tool 205 may comprise a suction cup substantially centered within the tool. In addition, the end of arm tool 205 may comprise a plurality of pinching portions, e.g., four independently actuatable pinching portions, to facilitate various different grasp modes 206.

Figures 2A, 2B, 2C, 2D:
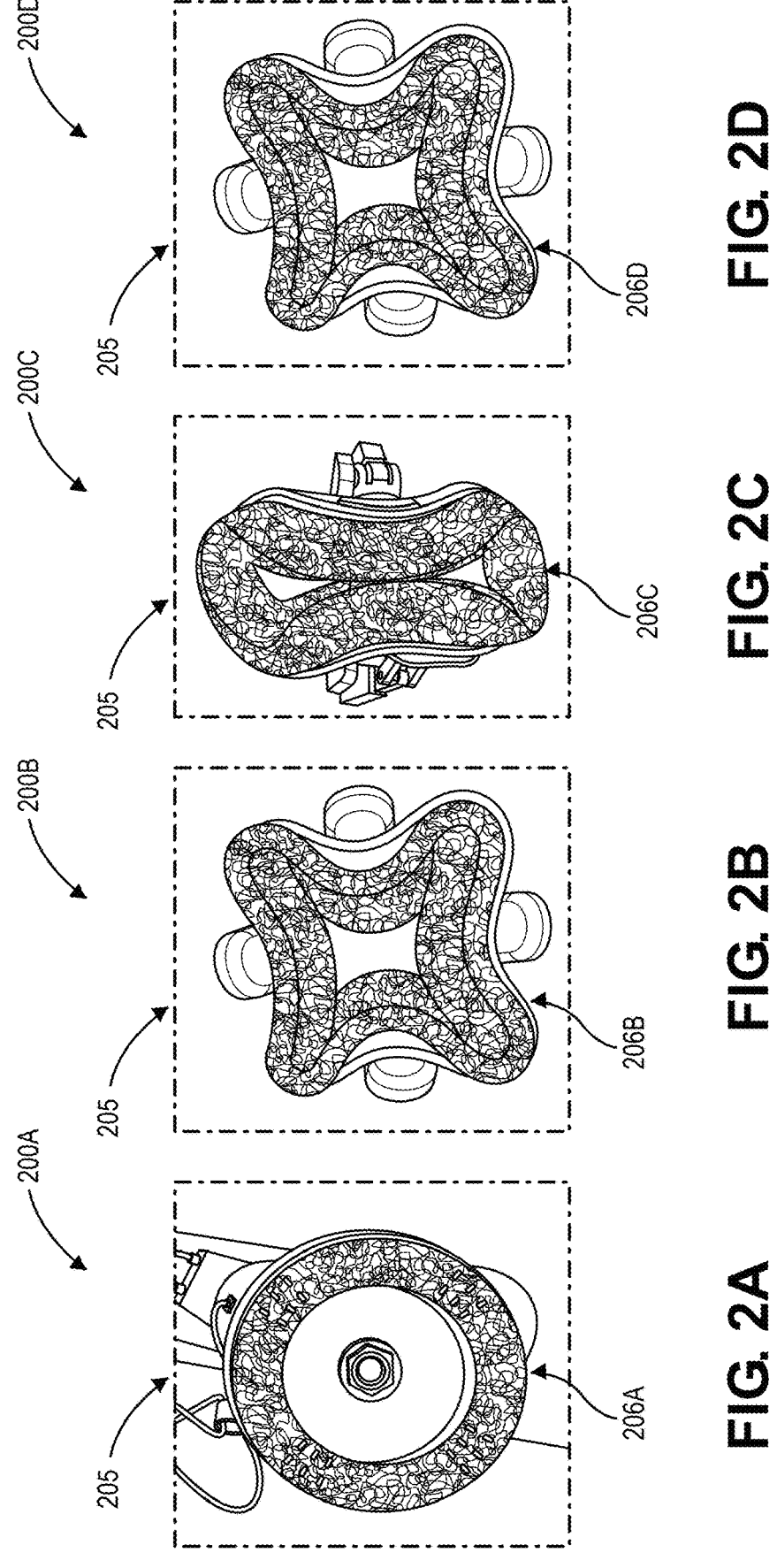
FIGS. 2A-2D are schematic diagrams of example grasp modes for a robotic end of arm tool, in accordance with implementations of the present disclosure.

For example, as shown in FIG. 2A, the end of arm tool 205 may be configured in a flat mode 206A in which the suction cup is actuated for flat suction, without any actuation of the pinching portions. Generally, the flat mode 206A may be utilized to apply suction to sufficiently smooth, flat surfaces with relatively large dimensions of an item to be grasped.

In addition, as shown in FIG. 2B, the end of arm tool 205 may be configured in a full pinch mode 206B in which the suction cup is actuated and all four pinching portions are actuated for pinching around an entire periphery or portion of an item, e.g., subsequent to or concurrent with application of suction or vacuum. Generally, the full pinch mode 206B may be utilized to apply suction and pinching to substantially smooth, flat surfaces with relatively small dimensions of an item to be grasped.

Further, as shown in FIG. 2C, the end of arm tool 205 may be configured in a parallel pinch mode 206C in which the suction cup is actuated and two opposing pinching portions are actuated for pinching along an edge, seam, or crease of an item, e.g., subsequent to or concurrent with application of suction or vacuum. Generally, the parallel pinch mode 206C may be utilized to apply suction and parallel pinching to angled, curved, or other discontinuous surfaces, e.g., an associated edge, seam, or crease, of an item to be grasped.

Moreover, as shown in FIG. 2D, the end of arm tool 205 may be configured in a small cup mode 206D in which all four pinching portions are actuated and the suction cup is actuated, e.g., generally subsequent to actuation of the pinching portions. Generally, the small cup mode 206D may be utilized to apply suction to relatively smooth, flat surfaces with uneven dimensions of an item to be grasped.

Various other end of arm tools and associated end effectors may be utilized with the grasp generation systems and methods described herein other than the example embodiments illustrated and described herein with respect to FIGS. 2A-2D. In addition, other end of arm tools may comprise various different actuating/grasping/picking portions and/or grasp modes, including different types, numbers, configurations, or combinations of grasp modes, such as grasping, pinching, suction, pushing, pulling, lifting, enveloping, or others.

Figure 3:
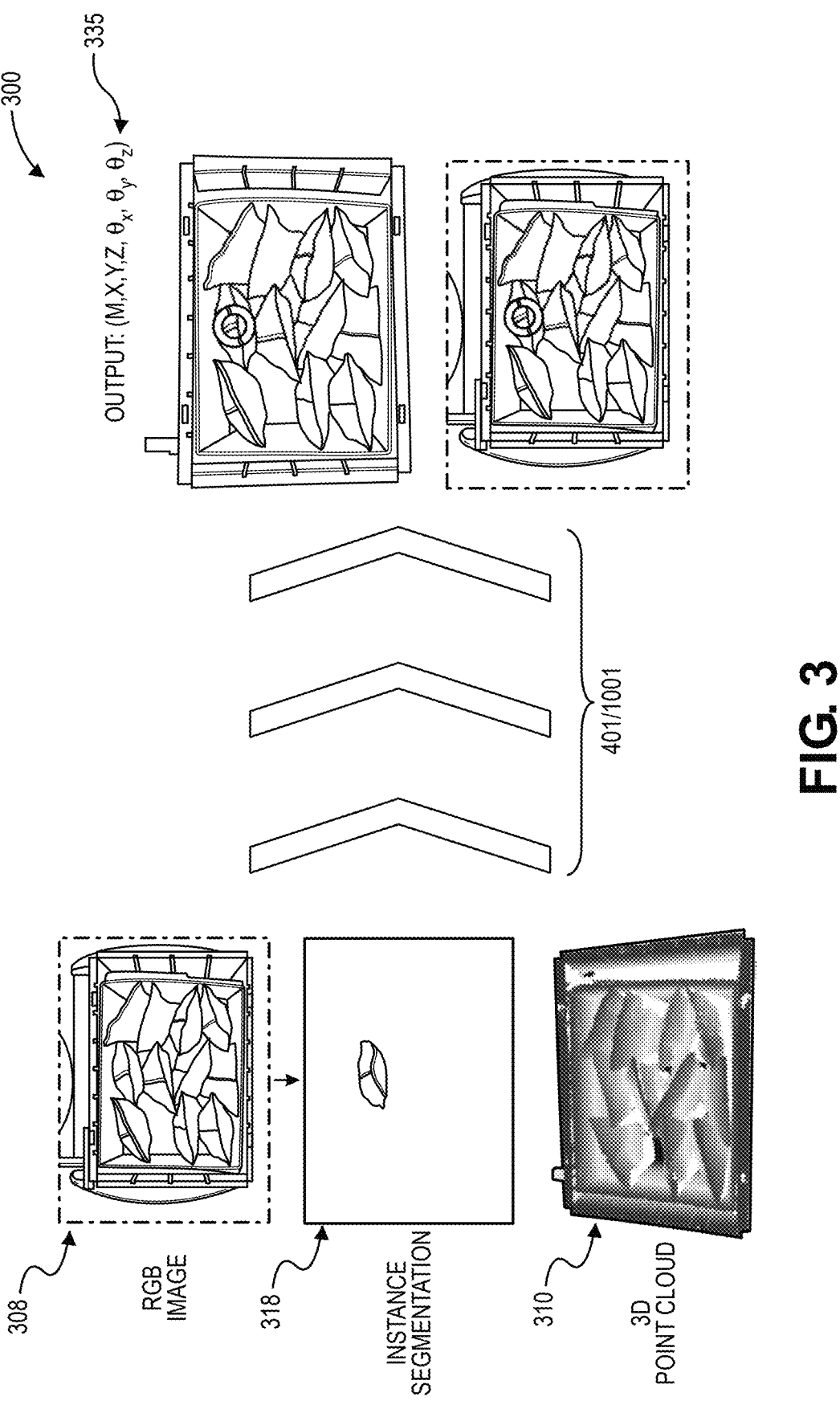
FIG. 3 is a schematic flow diagram of an example instance-wise, multi-modal, grasp generation system and method, in accordance with implementations of the present disclosure.

FIG. 3 is a schematic flow diagram 300 of an example instance-wise, multi-modal, grasp generation system and method, in accordance with implementations of the present disclosure.

As shown in FIG. 3, an example instance-wise, multi-modal, grasp generation system and method may include processing imaging data 308 and depth data 310 to generate instance data, processing the instance data using a heuristic module 401 and/or a learning module 1001, and generating output 335 including a grasp mode (M), a grasp position (X, Y, Z), and/or a grasp orientation ($\theta_X$, $\theta_Y$, $\theta_Z$). Various other symbols or characters may be used to denote the output 335 of the heuristic module 401 and/or the learning module 1001.

In some example embodiments described herein, processing the imaging data 308. e.g., an RGB (red-green-blue) image, may include performing instance segmentation upon the imaging data 308 to isolate a single item or instance from among a plurality of items within the imaging data 308. Based on the instance segmentation, an instance segmentation mask 318 associated with the single item or instance may be generated. Further, the depth data 310, e.g., 3D (three-dimensional) point cloud data, may be processed together with the instance segmentation mask 318 in order to generate instance data comprising an isolated instance point cloud. Further details of the processing of the imaging data 308 and depth data 310 to generate isolated instance point clouds are described herein at least with respect to FIG. 5.

In addition, processing the instance data using a heuristic module 401 may comprise various steps, including segmenting one or more planes associated with the single item, determining a plane point cloud for each of the one or more planes, determining a fitted plane for each of the plane point clouds, determining a minimum volume bounding box associated with the fitted plane and around the single item for each of the one or more fitted planes, and determining an axis normal to the fitted plane for each of the one or more fitted planes. Further, the axis normal to the fitted plane may be compared with a z-axis based on a global reference frame, and if the axis is substantially aligned with the z-axis, x-y dimensions of the minimum volume bounding box may be determined. Thereafter, the grasp mode, grasp position, and/or grasp orientation 335 for the single item or instance may be generated based at least in part on various attributes and/or dimensions of the minimum volume bounding box.

If, however, the axis is not substantially aligned with the z-axis, an intersection line between an upper bounding plane and the fitted plane may be determined, and thereafter, the grasp mode, grasp position, and/or grasp orientation 335 for the single item or instance may be generated based at least in part on various attributes and/or dimensions of the minimum volume bounding box and/or the intersection line. Further details of the processing of the instance data using a heuristic module 401 are described herein at least with respect to FIGS. 4 and 6-9.

In additional example embodiments described herein, processing the imaging data 308, e.g., an RGB (red-green-blue) image, may include performing instance segmentation upon the imaging data 308 to isolate a single item or instance from among a plurality of items within the imaging data 308. Based on the instance segmentation, an instance segmentation mask 318 associated with the single item or instance may be generated. In addition, the depth data 310, e.g., 3D (three-dimensional) point cloud data, may be processed together with the imaging data 308 and the instance segmentation mask 318 in order to generate instance data comprising cropped imaging and depth data associated with the single item or instance, as well as cropped depth data with the applied instance segmentation mask. Then, the instance data may be processed to generate various voxel representations, including TSDF (truncated signed distance function) voxels, RGB (red-green-blue) voxels, and instance mask voxels. Further details of the processing of the imaging data 308 and depth data 310 to generate voxel representations are described herein at least with respect to FIGS. 10-12.

In addition, processing the instance data using a learning module 1001 may comprise various steps, including encoding the voxel representations for further processing by one or more heads, classifiers, models, or networks, processing the voxel representations by a mode classifier to generate a probability distribution for the plurality of grasp modes, processing the voxel representations by a position decoder to generate one or more position maps associated with respective grasp modes of the plurality of grasp modes, and processing the voxel representations by an orientation decoder to generate at least one orientation map associated with at least one grasp mode of the plurality of grasp modes. Thereafter, the grasp mode, grasp position, and/or grasp orientation 335 for the single item or instance may be generated based on the various outputs of the mode classifier, position decoder, and orientation decoder. Further details of the processing of the instance data using a learning module 1001 are described herein at least with respect to FIGS. 10 and 13-14B.

Figure 4:
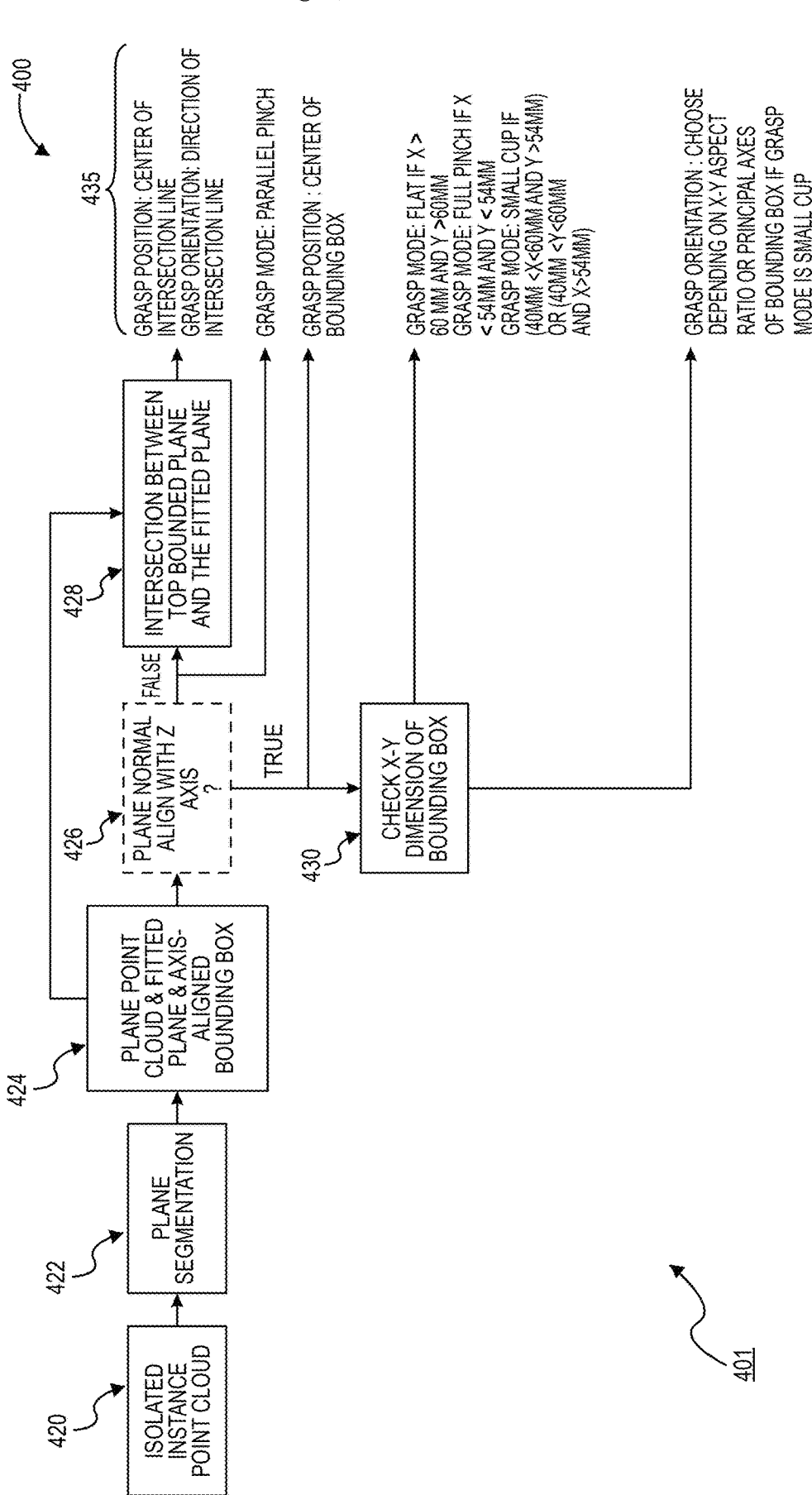
FIG. 4 is a schematic flow diagram of an example instance-wise, multi-modal, grasp generation system and method using a heuristic module, in accordance with implementations of the present disclosure.

FIG. 4 is a schematic flow diagram 400 of an example instance-wise, multi-modal, grasp generation system and method using a heuristic module 401, in accordance with implementations of the present disclosure.

As shown in FIG. 4, an example instance-wise, multi-modal, grasp generation system and method may utilize a heuristic module 401 to generate a grasp mode, a grasp position, and/or a grasp orientation for a single item or instance. The heuristic module 401 may include a set of rules and/or decisions based on attributes of a single item or instance detected within the imaging and depth data.

In example embodiments, the heuristic module 401 may receive an isolated instance point cloud 420 as an input, and may process the isolated instance point cloud using plane segmentation 422. Then, for each of a plurality of segmented planes, the heuristic module 401 may determine a plane point cloud, may fit a plane to the plane point cloud, may apply a minimum volume bounding box to the fitted plane and around the point cloud, and may determine an axis normal to the fitted plane within the minimum volume bounding box 424. The heuristic module 401 may then determine whether the axis normal to the fitted plane is substantially aligned with a z-axis based on a global reference frame 426. If the axis is not substantially aligned with the z-axis, then the heuristic module 401 may determine an intersection line between an upper bounding plane (or top bounded plane) of the minimum volume bounding box and the fitted plane 428, in order to determine the grasp mode, grasp position, and/or grasp orientation based at least in part on aspects and/or dimensions of the minimum volume bounding box and/or the intersection line. Alternatively, if the axis is substantially aligned with the z-axis, then the heuristic module 401 may determine x-y dimensions of the minimum volume bounding box 430, in order to determine the grasp mode, grasp position, and/or grasp orientation based at least in part on aspects and/or dimensions of the minimum volume bounding box.

The isolated instance point cloud 420 may be generated by processing the imaging data and the depth data. For example, the imaging data may be processed using instance segmentation to isolate a single item or instance within the imaging data. Then, the instance segmentation mask of the single item may be overlaid onto the depth data to generate the isolated instance point cloud 420 associated with the single item or instance to be grasped. Further details of the processing of imaging and depth data to generate the isolated instance point cloud 420 are described herein at least with respect to FIG. 5.

The plane segmentation 422 may receive the isolated instance point cloud 420 as input and may perform geometric analysis on the isolated instance point cloud 420 to generate or extract one or more segmented planes or plane point clouds. For example, the segmented planes or plane point clouds may generally correspond to one or more surfaces, planes, or other generally flat areas or regions of the single item or instance within the isolated instance point cloud 420.

In addition, the one or more segmented planes or plane point clouds may have various different numbers, distribution, and/or density of points associated with respective plane point clouds. In some examples, one or more segmented planes or plane point clouds may be selected for further processing based on the number, distribution, and/or density of points associated with respective plane point clouds. For example, one or more plane point clouds having the highest number of points, the largest or most even distribution of points, and/or the greatest density of points may be selected for further processing as potential or candidate picking/grasping surfaces. In other examples, substantially all segmented planes or plane point clouds may be further processed as potential or candidate picking/grasping surfaces.

For each of the segmented planes or plane point clouds that are to be further processed, a respective plane point cloud may be determined or selected, a plane may be fitted to the plane point cloud, a minimum volume bounding box may be applied to or around the fitted plane and point cloud, and an axis normal to the fitted plane within the minimum volume bounding box may be determined 424. For example, based on a plurality of points of the selected plane point cloud, a plane may be fitted, e.g., a best fit, to the plurality of points. In addition, a minimum volume bounding box may be generated around the fitted plane and also around substantially all points of the isolated instance point cloud. Further, an axis normal to the fitted plane within the minimum volume bounding box may be generated. The minimum volume bounding box, the fitted plane, and/or the axis normal to the fitted plane, or attributes thereof, may be used for further processing as described herein.

In addition, the one or more fitted planes within minimum volume bounding boxes may have various different numbers, distribution, and/or density of points associated with respective fitted planes and plane point clouds. In some examples, one or more fitted planes may be selected for further processing based on the number, distribution, and/or density of points associated with respective planes. For example, one or more fitted planes having the highest number of points, the largest or most even distribution of points, and/or the greatest density of points may be selected for further processing as potential or candidate picking/grasping surfaces. In other examples, substantially all fitted planes may be further processed as potential or candidate picking/grasping surfaces.

For the one or more fitted planes that are to be further processed, it may be determined whether the axis normal to the fitted plane is substantially aligned with a z-axis based on a global reference frame 426. The global reference frame may generally coincide with a x-y-z coordinate frame associated with the robotic arm, imaging device, depth sensor, and/or picking area. For example, the x- and y-axes of the global reference frame may generally extend horizontally, e.g., generally parallel with respect to ground and/or a substantially flat surface of the picking area. In addition, the z-axis of the global reference frame may generally extend vertically, e.g., generally perpendicular with respect to ground and/or a substantially flat surface of the picking area. Further, the z-axis of the global reference frame may generally extend parallel with optical axes of the imaging device and/or the depth sensor, which may be positioned overhead or in a top-down orientation with respect to the picking area.

If it is determined at 426 that the axis normal to the fitted plane is not substantially aligned with the z-axis, an intersection line between an upper bounding plane (or top bounded plane) and the fitted plane may be determined 428. For example, because the axis normal to the fitted plane is not aligned with the z-axis, it may be assumed that the fitted plane is not orthogonal with respect to the z-axis. Thus, the fitted plane may be assumed to intersect with an upper bounding plane of the minimum volume bounding box, thereby generating an intersection line between the upper bounding plane and the fitted plane.

Furthermore, because the axis normal to the fitted plane is not aligned with the z-axis, the output 435 of a grasp mode, grasp position, and grasp orientation may be determined based at least in part on the intersection line and/or the minimum volume bounding box, or attributes thereof. For example, the grasp mode may be selected as parallel pinch mode to pick/grasp the single item along an edge, crease, seam, or other feature that extends generally along the intersection line. In addition, the grasp position may be selected as a center point of the intersection line. Further, the grasp orientation may be selected as extending along the direction of the intersection line, such that the parallel pinch mode picks/grasps the item by pinching opposing sides or surfaces with respect to the intersection line.

In the example embodiments of FIGS. 4-9, the grasp orientation may generally correspond to an orientation around the z-axis, e.g., Oz which may be referred to as yaw, and the grasp orientation with respect to orientations around the x-axis and the y-axis may generally remain fixed or held, e.g., no changes to Ox or By which may be referred to as pitch or roll, respectively. Other example embodiments and various other grasp modes may include grasp orientations that include changes in orientation around two or more of the x-, y-, and z-axes, e.g., $\theta_X$, $\theta_Y$, and/or $\theta_Z$.

If, however, it is determined at 426 that the axis normal to the fitted plane is substantially aligned with the z-axis, then the x-y dimensions of the minimum volume bounding box may be determined 430. For example, because the axis normal to the fitted plane is aligned with the z-axis, it may be assumed that the fitted plane is orthogonal with respect to the z-axis, such that the fitted plane represents a substantially flat plane or surface of the single item that may be utilized for picking/grasping.

Furthermore, because the axis normal to the fitted plane is aligned with the z-axis, the output 435 of a grasp mode, grasp position, and grasp orientation may be determined based at least in part on the minimum volume bounding box or attributes thereof. For example, if both of the x- and y-dimensions of the fitted plane within the minimum volume bounding box are relatively large, e.g., greater than approximately 54 mm, approximately 60 mm, approximately 70 mm, or other values, the grasp mode may be selected as flat mode. In addition, if both of the x- and y-dimensions of the fitted plane within the minimum volume bounding box are relatively small, e.g., less than approximately 40 mm, approximately 50 mm, approximately 54 mm, or other values, the grasp mode may be selected as full pinch mode. Moreover, if one of the x- and y-dimensions of the fitted plane within the minimum volume bounding box is relatively small or nominally sized, e.g., between approximately 40 mm and approximately 60 mm, between approximately 40 mm and approximately 70 mm, or other ranges of values, and the other of the x- and y-dimensions of the fitted plane within the minimum volume bounding box is relatively large, e.g., greater than approximately 54 mm, approximately 60 mm, approximately 70 mm, or other values, the grasp mode may be selected as small cup mode.

In addition, for each of selected grasp modes of flat mode, full pinch mode, or small cup mode, the grasp position may be selected as a center point of the minimum volume bounding box. Further, for the selected grasp modes of flat mode and full pinch mode, the grasp orientation may not be particularly important or relevant, e.g., for rotationally symmetric end effectors. For the selected grasp mode of small cup mode, the grasp orientation may be selected dependent upon the x-y dimensions of the fitted plane within the minimum volume bounding box, e.g., based on an aspect ratio and/or principal axes associated with the x-y dimensions, which may be more important or relevant for rotationally asymmetric end effectors.

Generally, the grasp orientation for the small cup mode, e.g., particularly for rotationally asymmetric end effectors, may be selected to leverage a longer dimension among the x-y dimensions of the fitted plane within the minimum volume bounding box. In some examples, the longer dimension may be determined based on an aspect ratio between the x-y dimensions, or based on a determination of principal axes of the minimum volume bounding box. In one example, principal component analysis (PCA) may be utilized to determine or compute the principal axes, e.g., longest dimension, medium dimension, and shortest dimension, of the minimum volume bounding box, and the longest dimension may be utilized to select the corresponding grasp orientation.

As set forth above, in the example embodiments of FIGS. 4-9, the grasp orientation may generally correspond to an orientation around the z-axis, e.g., Oz which may be referred to as yaw, and the grasp orientation with respect to orientations around the x-axis and the y-axis may generally remain fixed or held, e.g., no changes to ex or By which may be referred to as pitch or roll, respectively. Other example embodiments and various other grasp modes may include grasp orientations that include changes in orientation around two or more of the x-, y-, and z-axes, e.g., $\theta_X$, $\theta_Y$, and/or $\theta_Z$.

Although FIG. 4 illustrates a particular set or sequence of rules and/or decisions for a heuristic module, other example embodiments of a heuristic module may include other sets or sequences of rules and/or decisions. For example, the various rules and/or decisions for selection among grasp modes may be generalized or modified for end effectors having different sizes, shapes, grasping modalities, or other aspects. In addition, the various rules and/or decisions may be further generalized or modified to identify and leverage various aspects or attributes of single items or instances, e.g., different surfaces, planes, areas, edges, creases, corners, holes, cavities, handles, or other features or attributes. Further, the various rules and/or decisions may be further generalized or modified in order to generate item grasping data for various other types of end effectors and associated grasping characteristics, capabilities, or modalities.

Figure 5:
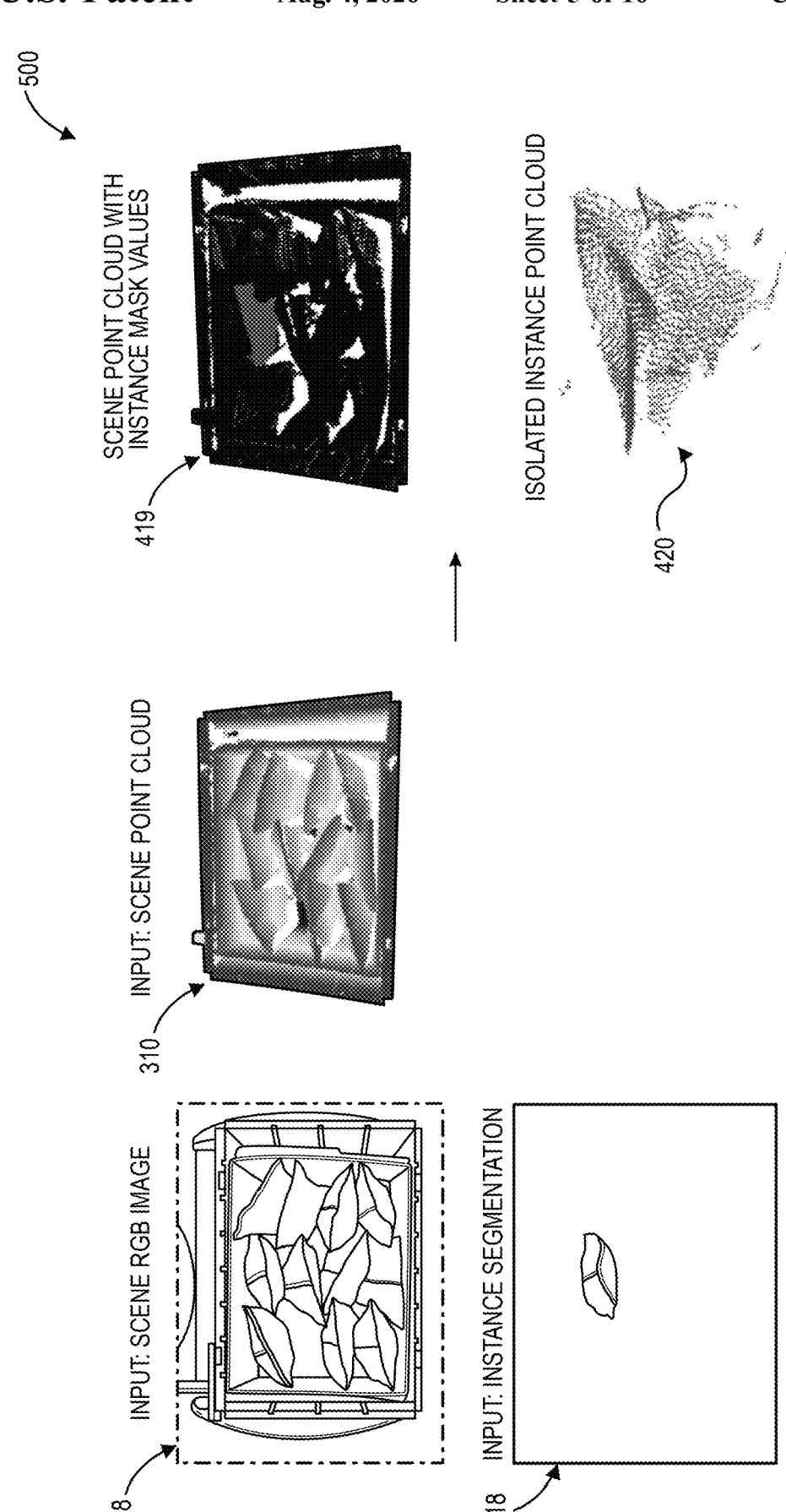
FIG. 5 is a schematic flow diagram of an example instance point cloud generator for an instance-wise, multi-modal, grasp generation system and method, in accordance with implementations of the present disclosure.

FIG. 5 is a schematic flow diagram 500 of an example instance point cloud generator for an instance-wise, multi-modal, grasp generation system and method, in accordance with implementations of the present disclosure.

As shown in FIG. 5, in order to generate an isolated instance point cloud 420, the imaging data 308 and the depth data 310 may be processed. For example, the imaging data 308. e.g., RGB image, may be processed using instance segmentation to isolate a single item or instance within the imaging data, thereby generating an instance segmentation mask 318 that isolates a single item or instance. Generally, the instance segmentation process may generate a plurality of instance segmentation masks associated with individual items represented within the imaging data 308.

Then, the instance segmentation mask 318 of a single item may be overlaid or projected onto the depth data 310, e.g., scene point cloud. Such overlaying or projecting of the instance segmentation mask 318 onto the depth data 310 may result in depth data with an applied instance segmentation mask 419, e.g., a scene point cloud with instance mask values. From the depth data with the applied instance segmentation mask 419, the isolated instance point cloud 420 may be generated or extracted, e.g., by selecting only those portions of the depth data that correspond to the instance segmentation mask.

The isolated instance point cloud 420 may then be used by the heuristic module 401 and/or the learning module 1001, as further described herein, to generate item grasping data.

Figure 6:
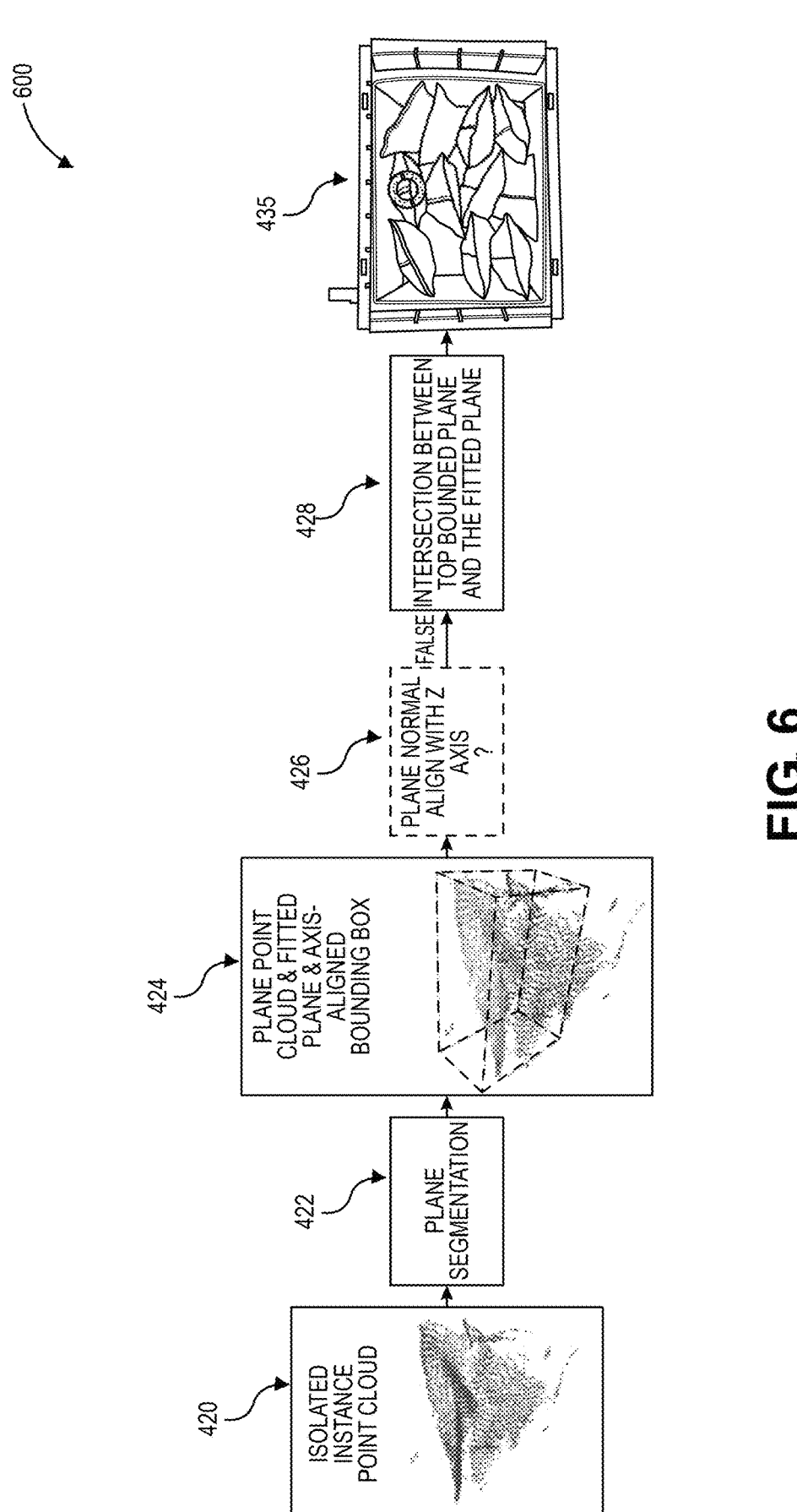
FIG. 6 is a schematic flow diagram of an example instance-wise, multi-modal, grasp generation using the heuristic module, in accordance with implementations of the present disclosure.

FIG. 6 is a schematic flow diagram 600 of an example instance-wise, multi-modal, grasp generation using the heuristic module, in accordance with implementations of the present disclosure.

As shown in FIG. 6, an example of generating item grasping data using the heuristic module is illustrated, e.g., to pick/grasp a single item such as a bag or package of chips, crackers, or other snacks. The isolated instance point cloud 420 may be received as input to the heuristic module, e.g., from an instance point cloud generator as described herein at least with respect to FIG. 5. The isolated instance point cloud 420 may be processed using plane segmentation 422 to generate one or more potential or candidate segmented planes or plane point clouds.

Then, the one or more segmented planes may be processed to generate a fitted plane, a minimum volume bounding box, and an axis normal to the fitted plane 424. The axis normal to the fitted plane may then be compared with a z-axis based on a global reference frame 426 to determine whether the axis normal substantially aligns with the z-axis.

In the example illustrated in FIG. 6, it may be determined that the axis normal to the fitted plane does not align with the z-axis. As a result, an intersection line between an upper bounding plane of the minimum volume bounding box and the fitted plane may be determined or generated. Then, as described herein at least with respect to FIG. 4, a grasp mode, grasp position, and grasp orientation may be selected or determined as outputs 435. In this example, the grasp mode may be selected as parallel pinch mode, the grasp position may be selected as a center point of the intersection line, and the grasp orientation may be selected as extending along a direction of the intersection line.

Figure 7:
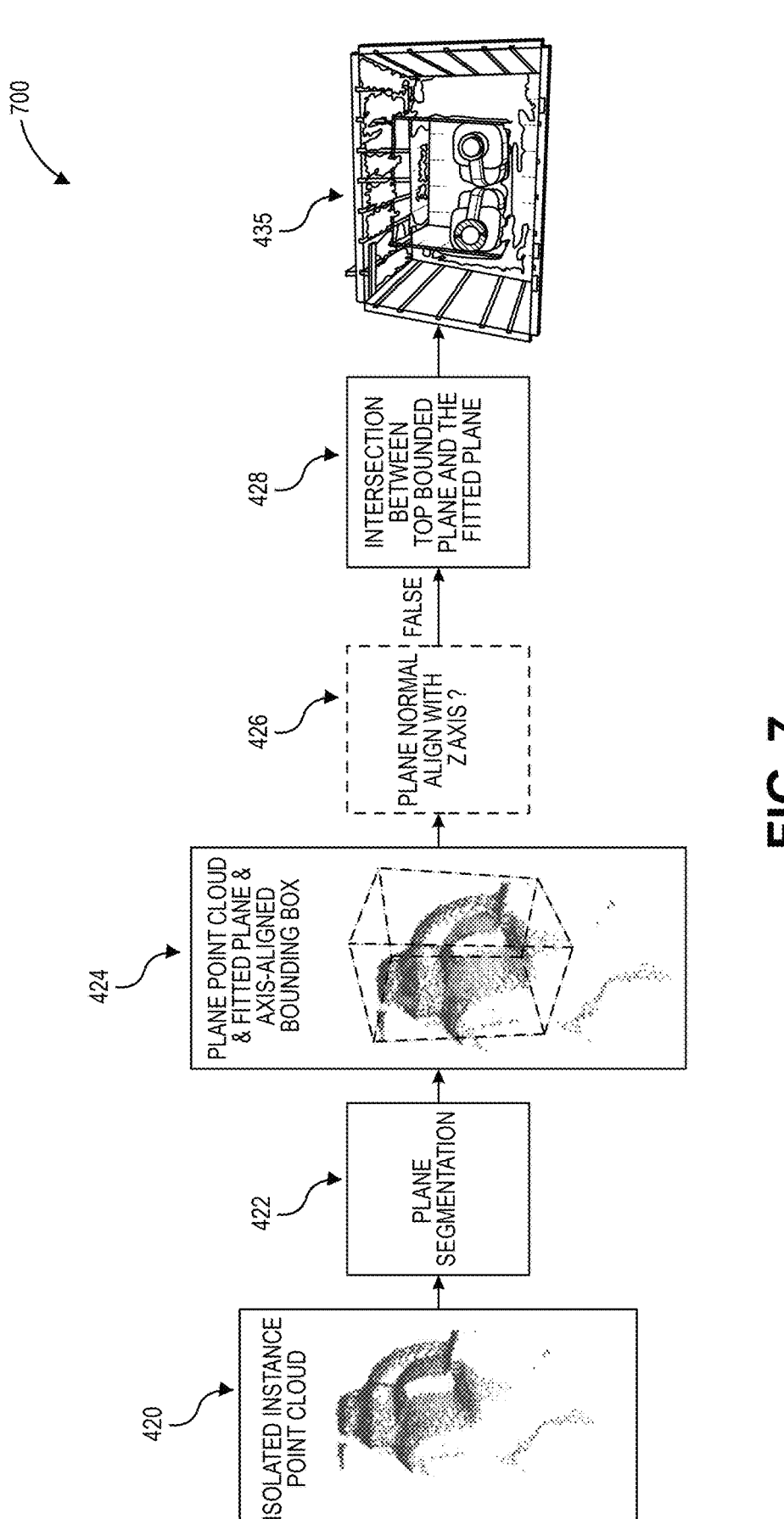
FIG. 7 is a schematic flow diagram of another example instance-wise, multi-modal, grasp generation using the heuristic module, in accordance with implementations of the present disclosure.

FIG. 7 is a schematic flow diagram 700 of another example instance-wise, multi-modal, grasp generation using the heuristic module, in accordance with implementations of the present disclosure.

As shown in FIG. 7, another example of generating item grasping data using the heuristic module is illustrated, e.g., to pick/grasp a single item such as a large bottle, jug, or container. The isolated instance point cloud 420 may be received as input to the heuristic module, e.g., from an instance point cloud generator as described herein at least with respect to FIG. 5. The isolated instance point cloud 420 may be processed using plane segmentation 422 to generate one or more potential or candidate segmented planes or plane point clouds.

Then, the one or more segmented planes may be processed to generate a fitted plane, a minimum volume bounding box, and an axis normal to the fitted plane 424. In the example of FIG. 7, a segmented plane along a side surface of the item may be selected, e.g., based on a number, distribution, and/or density of points associated with the segmented plane on the side surface. The axis normal to the fitted plane may then be compared with a z-axis based on a global reference frame 426 to determine whether the axis normal substantially aligns with the z-axis.

In the example illustrated in FIG. 7, it may be determined that the axis normal to the fitted plane does not align with the z-axis, e.g., because a side surface of the item was selected for item picking/grasping. As a result, an intersection line between an upper bounding plane of the minimum volume bounding box and the fitted plane may be determined or generated 428. Then, as described herein at least with respect to FIG. 4, a grasp mode, grasp position, and grasp orientation may be selected or determined as outputs 435. In this example, the grasp mode may be selected as parallel pinch mode, the grasp position may be selected as a center point of the intersection line, and the grasp orientation may be selected as extending along a direction of the intersection line.

However, the selected grasp mode, grasp position, and grasp orientation in the example of FIG. 7 to pick/grasp the single item may be incorrect or unsuccessful. For example, grasping the large bottle, jug, or container using a parallel pinch mode applied to the cap of the item may be incorrect or unsuccessful. Thus, the heuristic module may be modified or refined to prevent or avoid such incorrect or unsuccessful determinations of item grasping data, as further described herein at least with respect to FIGS. 8 and 9.

Figure 8:
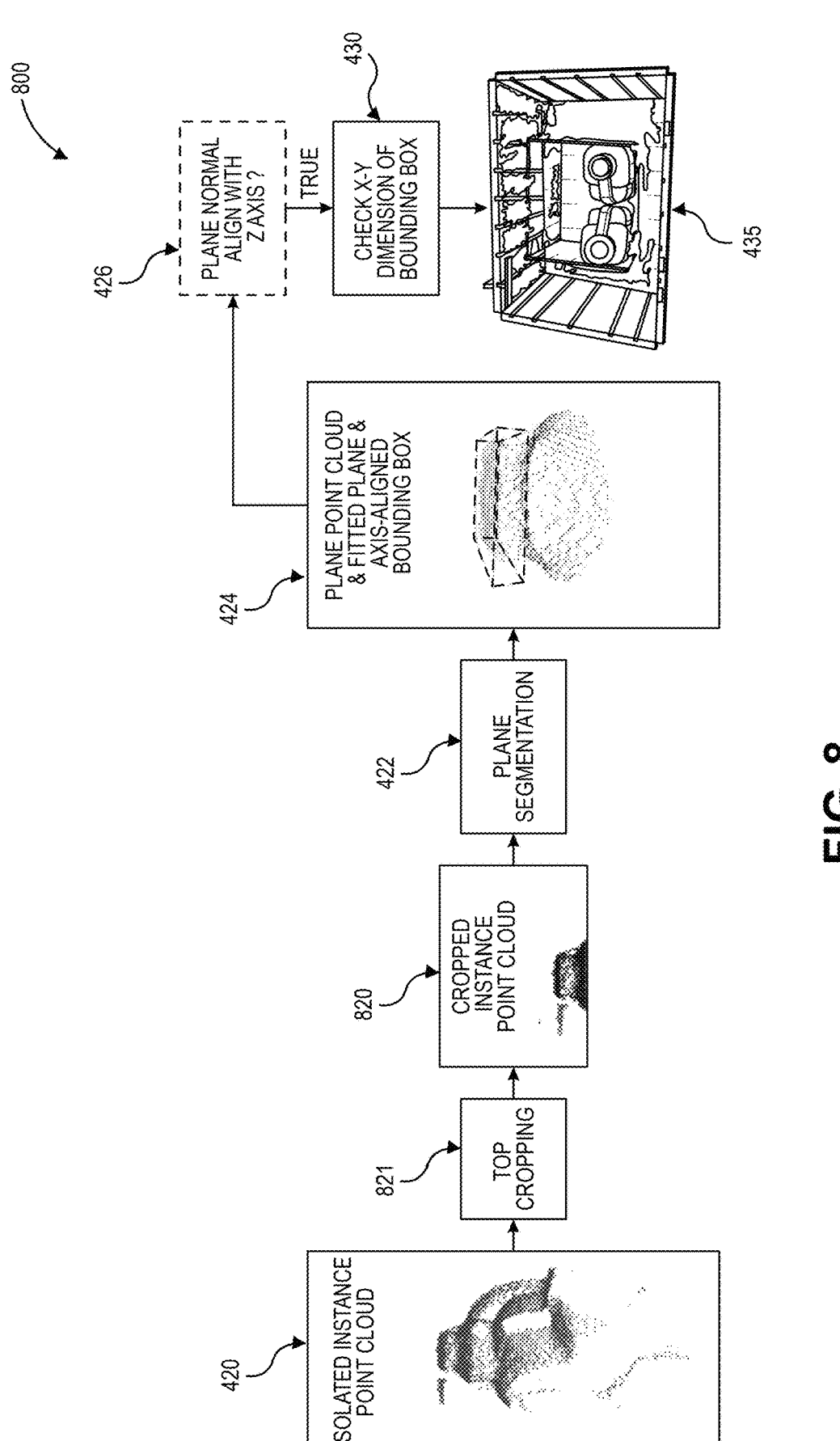
FIG. 8 is a schematic flow diagram of a further example instance-wise, multi-modal, grasp generation using a modified heuristic module, in accordance with implementations of the present disclosure.

FIG. 8 is a schematic flow diagram 800 of a further example instance-wise, multi-modal, grasp generation using a modified heuristic module, in accordance with implementations of the present disclosure.

As shown in FIG. 8, a further example of generating item grasping data using a modified heuristic module is illustrated, e.g., to pick/grasp a single item such as a large bottle or jug. The isolated instance point cloud 420 may be received as input to the heuristic module, e.g., from an instance point cloud generator as described herein at least with respect to FIG. 5.

The modified heuristic module may include the additional steps of top cropping 821 the isolated instance point cloud 420 to generate a cropped instance point cloud 820. For example, the top cropping 821 may maintain or retain only a certain portion, amount, or percentage of points of the isolated instance point cloud 420 that are positioned toward a top of the single item, e.g., at a lesser depth from the depth sensor. The remaining points of the isolated instance point cloud 420 that are positioned toward a bottom of the single item, e.g., at a greater depth from the depth sensor, may be cropped or removed from further processing, thereby generating the cropped instance point cloud 820. This may effectively bias the selection of segmented planes or plane point clouds for item picking/grasping toward planes or surfaces proximate a top or upper portion of the single item, thereby preventing or avoiding generation of incorrect or unsuccessful item grasping data as described herein with respect to FIG. 7.

The cropped instance point cloud 820 may then be processed using plane segmentation 422 to generate one or more potential or candidate segmented planes or plane point clouds. Then, the one or more segmented planes may be processed to generate a fitted plane, a minimum volume bounding box, and an axis normal to the fitted plane 424. In the example of FIG. 8, a segmented plane along an upper surface or cap of the item may be selected, e.g., based on a number, distribution, and/or density of points associated with the segmented plane on the side surface. The axis normal to the fitted plane may then be compared with a z-axis based on a global reference frame 426 to determine whether the axis normal substantially aligns with the z-axis.

In the example illustrated in FIG. 8, it may be determined that the axis normal to the fitted plane does align with the z-axis, e.g., because an upper surface of the item was selected for item picking/grasping following the top cropping. As a result, x-y dimensions of the minimum volume bounding box may be determined, based upon which item grasping data may be selected or determined 430. Then, as described herein at least with respect to FIG. 4, a grasp mode, grasp position, and grasp orientation may be selected or determined as outputs 435. In this example, the grasp mode may be selected as full pinch mode, the grasp position may be selected as a center point of the minimum volume bounding box, and the grasp orientation may not be particularly important or relevant for the selected grasp mode.

Figure 9:
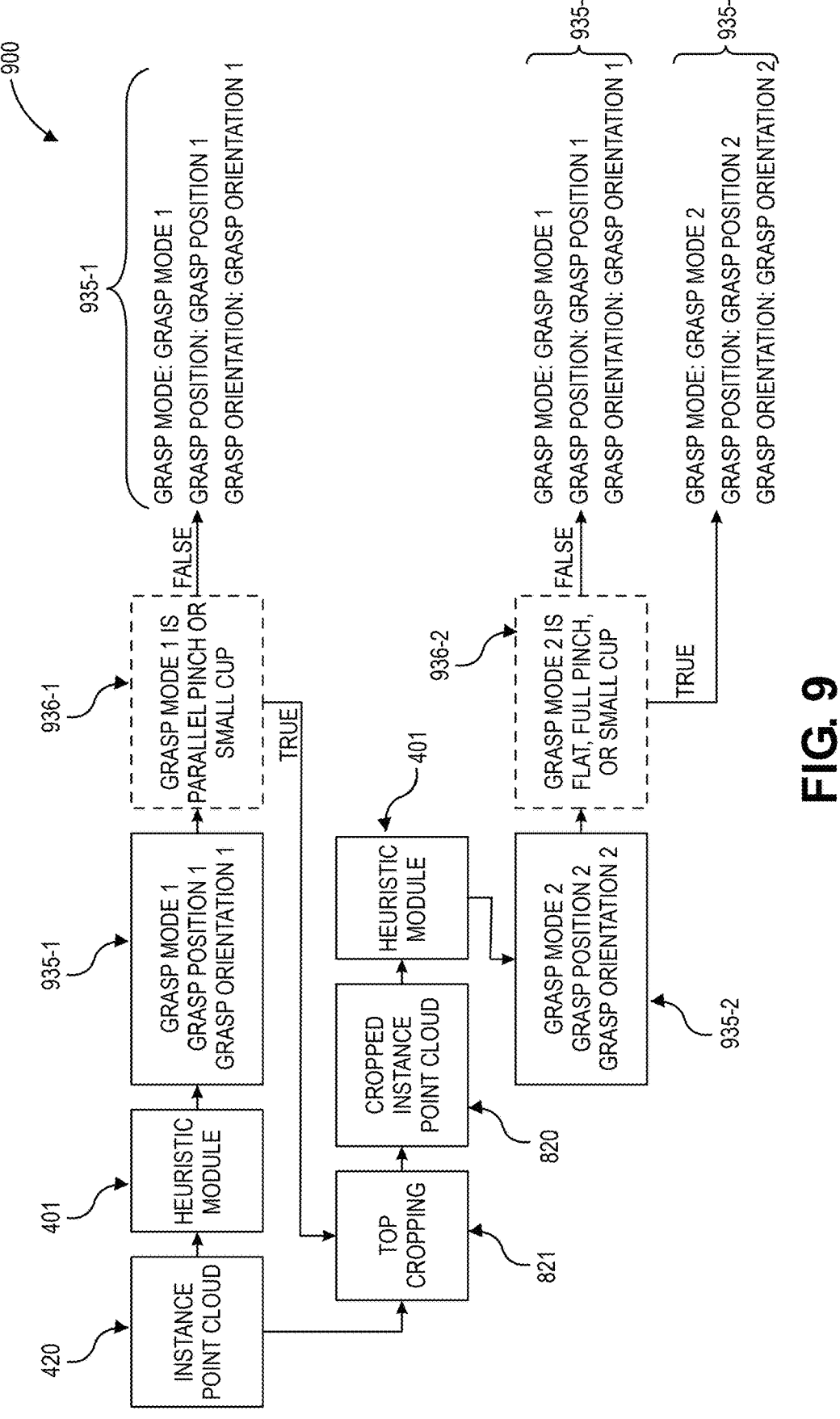
FIG. 9 is a schematic flow diagram of an example instance-wise, multi-modal, grasp generation system and method using a modified heuristic module, in accordance with implementations of the present disclosure.

FIG. 9 is a schematic flow diagram 900 of an example instance-wise, multi-modal, grasp generation system and method using a modified heuristic module, in accordance with implementations of the present disclosure.

As shown in FIG. 9, a modified heuristic module may include additional rules and/or decisions to prevent or avoid incorrect or unsuccessful generation of item grasping data, which may be similar to the example modified heuristic module described herein with respect to FIG. 8. The isolated instance point cloud 420 may be received as input to the heuristic module 401, e.g., from an instance point cloud generator as described herein at least with respect to FIG. 5. Then, the heuristic module 401 may process the isolated instance point cloud 420, as described herein, and generate a first output 935-1 including a grasp mode 1, grasp position 1, and grasp orientation 1.

In the example modified heuristic module of FIG. 9, it may be determined whether the grasp mode of the first output 935-1 is either a parallel pinch mode or a small cup mode 936-1. If the grasp mode 1 of the first output 935-1 is not either a parallel pinch mode or a small cup mode, e.g., the grasp mode 1 is a flat mode or a full pinch mode, the first output 935-1 may be provided as the item grasping data to pick/grasp a single item. This additional decision 936-1 related to the grasp mode of the first output 935-1 may result in additional processing for particular selected grasp modes, e.g., parallel pinch mode or small cup mode, which may generally lead to incorrect or unsuccessful item grasping data.

If, however, the grasp mode 1 of the first output 935-1 is either a parallel pinch mode or a small cup mode, the example modified heuristic module of FIG. 9 may perform top cropping 821 of the isolated instance point cloud 420 to generate a cropped instance point cloud 820. Alternatively, as shown in FIG. 9, the first iteration of the heuristic module to generate the first output 935-1 may be skipped or omitted, and top cropping 821 of the isolated instance point cloud 420 may be performed at the outset to generate a cropped instance point cloud 820, similar to that described with respect to FIG. 8. Then, the heuristic module 401 may process the cropped instance point cloud 820, as described herein, and generate a second output 935-2 including a grasp mode 2, grasp position 2, and grasp orientation 2.

In the example modified heuristic module of FIG. 9, it may be determined whether the grasp mode 2 of the second output 935-2 is either a flat mode, a full pinch mode, or a small cup mode 936-2. If the grasp mode 2 of the second output 935-2 is not either a flat mode, a full pinch mode, or a small cup mode, e.g., the grasp mode 2 is a parallel pinch mode, the first output 935-1 may be provided as the item grasping data to pick/grasp a single item. If, however, the grasp mode 2 of the second output 935-2 is either a flat mode, a full pinch mode, or a small cup mode, the second output 935-2 may be provided as the item grasping data to pick/grasp a single item.

This second additional decision 936-2 related to the grasp mode 2 of the second output 935-2, in combination with the first additional decision 936-1 related to the grasp mode 1 of the first output 935-1, may result in additional processing for particular selected grasp modes of the first output 935-1, e.g., parallel pinch mode or small cup mode. For example, the additional processing of the modified heuristic module of FIG. 9 may result in utilizing a grasp mode 2 from the second output 935-2 including either a flat mode, a full pinch mode, or a small cup mode in some cases in which the grasp mode 1 from the first output 935-1 was initially selected as a parallel pinch mode. In some examples similar to that illustrated in FIG. 7, the selection of a parallel pinch mode may correspond to a side surface of a single item, which may result in incorrect or unsuccessful item grasping. Accordingly, the modified heuristic module of FIG. 9 may effectively decrease the likelihood or probability of selection of a parallel pinch mode for item picking/grasping, and may correspondingly increase the likelihood or probability of selection of either a flat mode, a full pinch mode, or a small cup mode following further processing, which may be further facilitated by top cropping of isolated instance point clouds.

Using the heuristic modules and/or modified heuristic modules described herein, item grasping data may be generated based on imaging data and depth data of one or more items to be picked/grasped. The item grasping data may comprise a grasp mode, a grasp position, and/or a grasp orientation. Further, robotic arms or other automated machines, systems, or devices having associated end effectors may utilize the item grasping data to reliably and efficiently pick/grasp single items or instances to facilitate various material handling processes.

Figure 10:
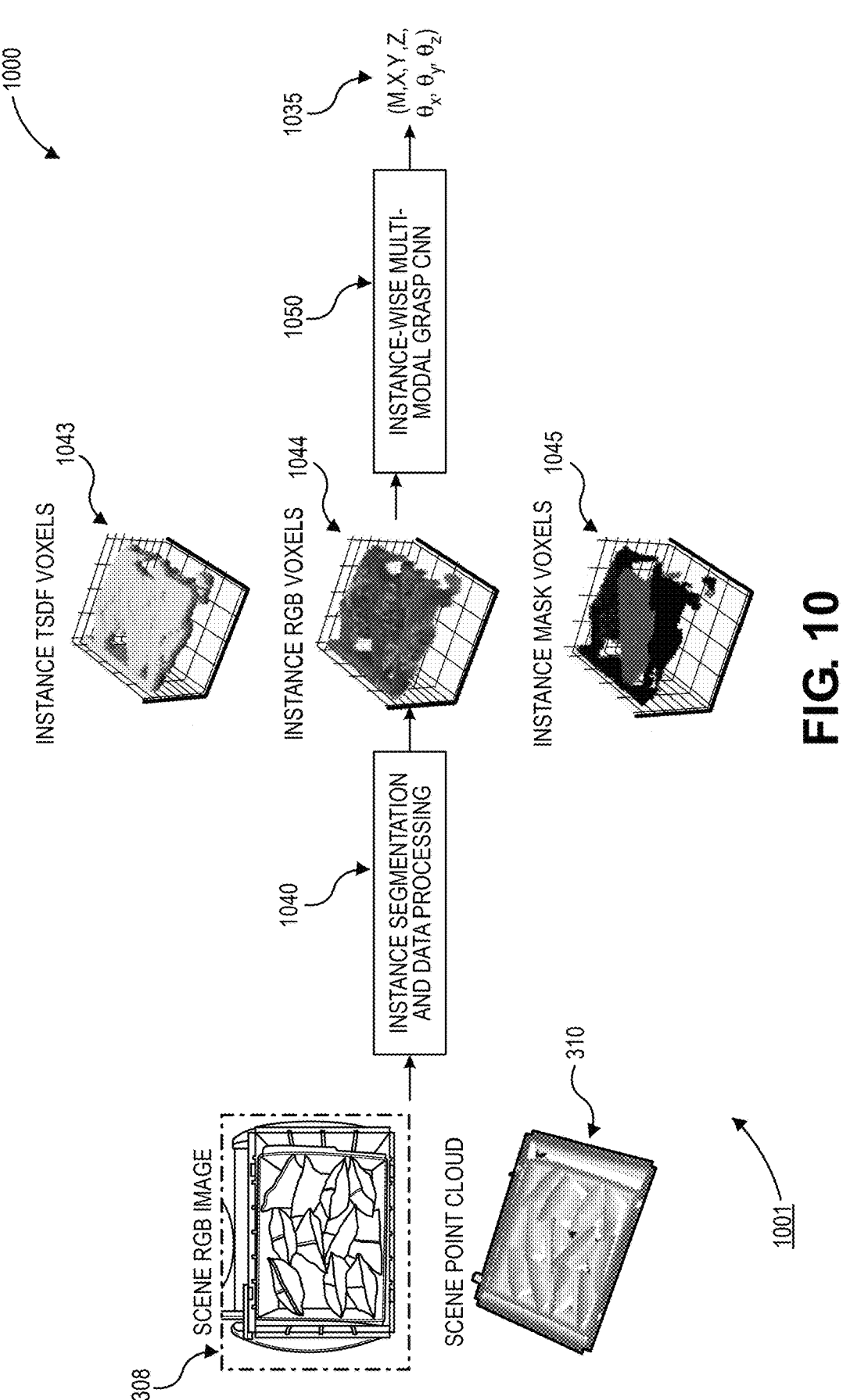
FIG. 10 is a schematic flow diagram of an example instance-wise, multi-modal, grasp generation system and method using a learning module, in accordance with implementations of the present disclosure.

FIG. 10 is a schematic flow diagram 1000 of an example instance-wise, multi-modal, grasp generation system and method using a learning module 1001, in accordance with implementations of the present disclosure.

As shown in FIG. 10, an example instance-wise, multi-modal, grasp generation system and method may utilize a learning module 1001 to generate a grasp mode, a grasp position, and/or a grasp orientation for a single item or instance. The learning module 1001 may comprise a machine learning model or algorithm, a convolutional neural network, or other types of neural networks, learning models, or algorithms that have been trained based on attributes of single items or instances detected within imaging and depth data.

In example embodiments, the learning module 1001 may process imaging data 308 and depth data 310 using instance segmentation and data processing 1040 to generate various voxel representations 1043, 1044, 1045 of the imaging and depth data. Further details of the instance segmentation and data processing 1040 are described herein at least with respect to FIG. 11, and further details of the generation of various voxel representations 1043, 1044, 1045 are described herein at least with respect to FIGS. 11 and 12.

Then, an instance-wise, multi-modal, grasp convolutional neural network (CNN) 1050 may receive and process the voxel representations 1043, 1044, 1045, in order to generate item grasping data 1035, including the grasp mode, grasp position, and/or grasp orientation for picking/grasping of a single item or instance. Further details of the instance-wise, multi-modal, grasp CNN 1050 are described herein at least with respect to FIGS. 13-14B.

Figure 11:
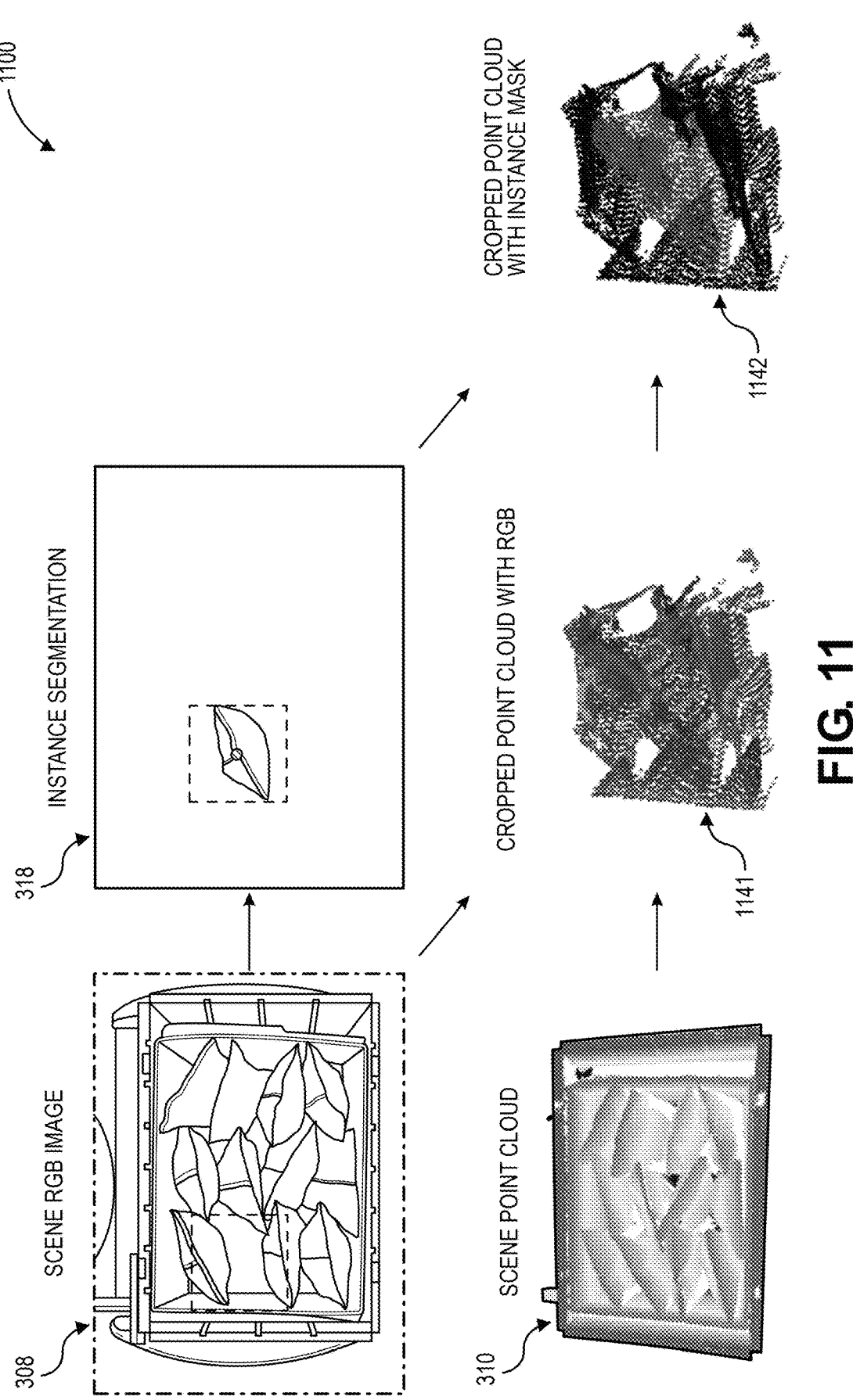
FIG. 11 is a schematic flow diagram of a portion of an example instance voxel generator for an instance-wise, multi-modal, grasp generation system and method, in accordance with implementations of the present disclosure.

FIG. 11 is a schematic flow diagram 1100 of a portion of an example instance voxel generator for an instance-wise, multi-modal, grasp generation system and method, in accordance with implementations of the present disclosure.

As shown in FIG. 11, in order to generate voxel representations of imaging and depth data, the imaging data 308 and the depth data 310 may be processed. For example, the imaging data 308, e.g., RGB image, may be processed using instance segmentation to isolate a single item or instance within the imaging data, thereby generating an instance segmentation mask 318 that isolates a single item or instance. Generally, the instance segmentation process may generate a plurality of instance segmentation masks associated with individual items represented within the imaging data 308.

Then, based on the instance segmentation mask 318 of a single item, the imaging data 308 and depth data 310 may be cropped. For example, a centroid of the instance segmentation mask 318 may be determined, and the imaging data 308 and depth data 310 may be cropped around or relative to the centroid of the instance segmentation mask 318. The size and/or shape of the resulting cropped imaging and depth data 1141, e.g., cropped point cloud with RGB, may be defined or configured based on memory and/or processing capabilities of the instance voxel generator and/or convolutional neural network 1050 of the learning module 1001.

Further, the instance segmentation mask 318 of the single item may be overlaid or projected onto the cropped imaging and depth data 1141. Such overlaying or projecting of the instance segmentation mask 318 onto the cropped imaging and depth data 1141 may result in a cropped point cloud with instance mask 1142, e.g., a cropped point cloud with RGB and associated instance mask values. In one example, the cropped imaging and depth data 1141 and/or the cropped point cloud with instance mask 1142 may have dimensions of 200 mm×200 mm×400 mm with 5 mm resolution (40× 40×80), in which 400 mm is a height measured from a base or surface of the picking area or container, and the 200 mm×200 mm region is centered on the single item or instance, e.g., a centroid of the instance segmentation mask 318.

Using the cropped imaging and depth data 1141 and the cropped point cloud with instance mask 1142, the various voxel representations 1043, 1044, 1045 may be generated for use as inputs to the convolutional neural network 1050 to generate item grasping data 1035. Further details of the generation of various voxel representations 1043, 1044, 1045 are described herein at least with respect to FIG. 12.

Figure 12:
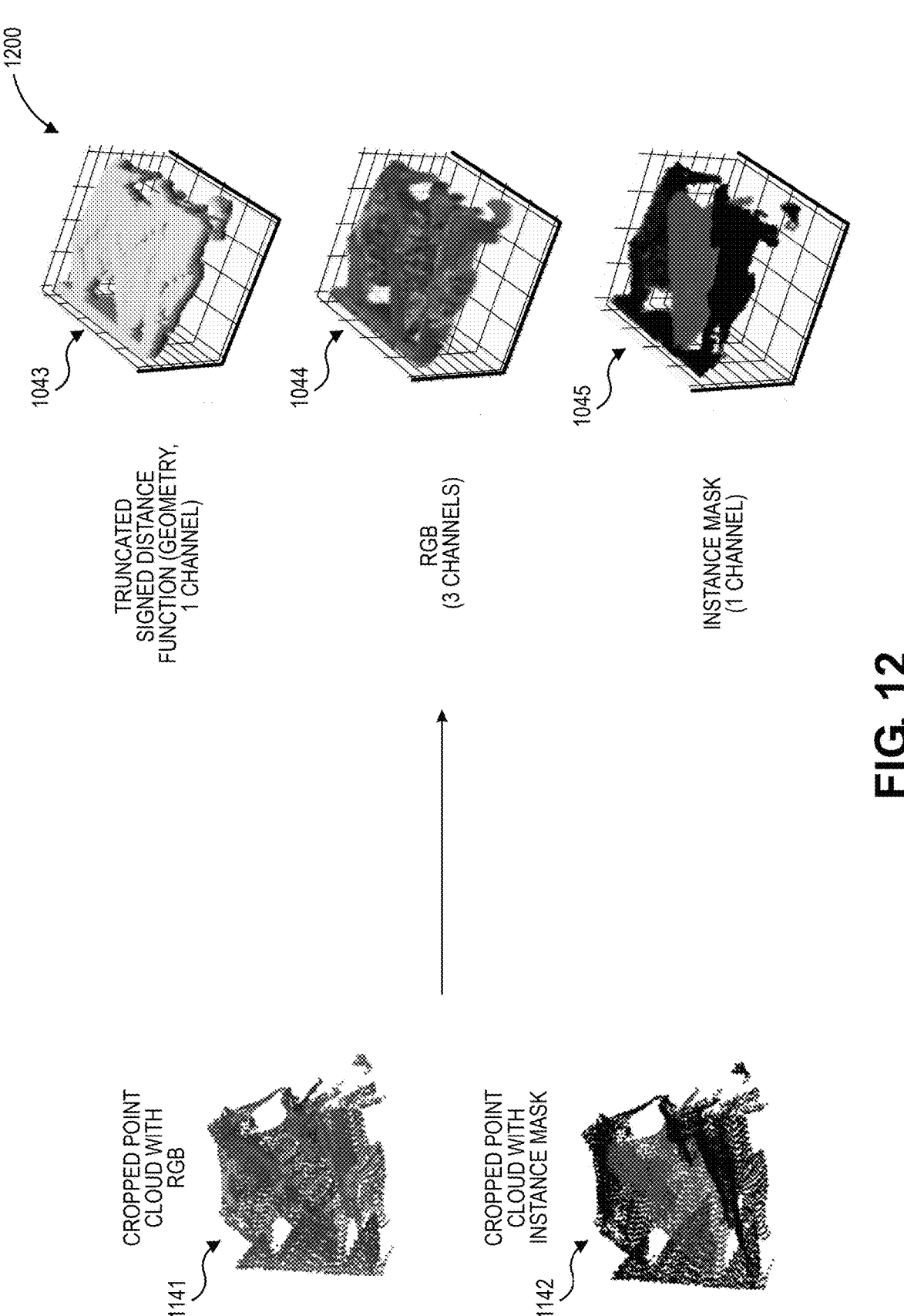
FIG. 12 is a schematic flow diagram of another portion of an example instance voxel generator for an instance-wise, multi-modal, grasp generation system and method, in accordance with implementations of the present disclosure.

FIG. 12 is a schematic flow diagram 1200 of another portion of an example instance voxel generator for an instance-wise, multi-modal, grasp generation system and method, in accordance with implementations of the present disclosure.

As shown in FIG. 12, in order to generate voxel representations of imaging and depth data, the cropped imaging and depth data 1141 and the cropped point cloud with instance mask 1142 for a single item or instance may be further processed using voxelization programs. Generally, voxels may be similar to point clouds, but may represent various data with a fixed resolution. The voxelization programs may process the cropped imaging and depth data 1141 and the cropped point cloud with instance mask 1142 for a single item or instance to generate truncated signed distance function (TSDF) voxels 1043, red-green-blue (RGB) voxels 1044, and instance mask voxels 1045.

For example, TSDF voxels 1043 may encode or represent depth data of the single item or instance, RGB voxels 1044 may encode or represent color data of the single item or instance, and instance mask voxels 1045 may encode or represent instance mask data, e.g., inclusion within or exclusion from an instance segmentation mask of a single item or instance.

In example embodiments, individual TSDF voxels 1043 may encode or represent distance or depth data from a predetermined or designated origin, resulting in TSDF voxels having a dimension of (1, 40, 40, 80). In addition, individual RGB voxels 1044 may encode or represent color values, resulting in RGB voxels having a dimension of (3, 40, 40, 80). Further, individual instance mask voxels 1045 may encode or represent a binary value related to inclusion within or exclusion from an instance segmentation mask of the single item or instance, resulting in instance mask voxels 1045 having a dimension of (1, 40, 40, 80). Thus, the voxel representations 1043, 1044, 1045 in aggregate may have a dimension of (5, 40, 40, 80).

The various voxel representations 1043, 1044, 1045 may then be provided as inputs to the instance-wise, multi-modal, grasp CNN 1050 to generate item grasping data 1035.

Figure 13:
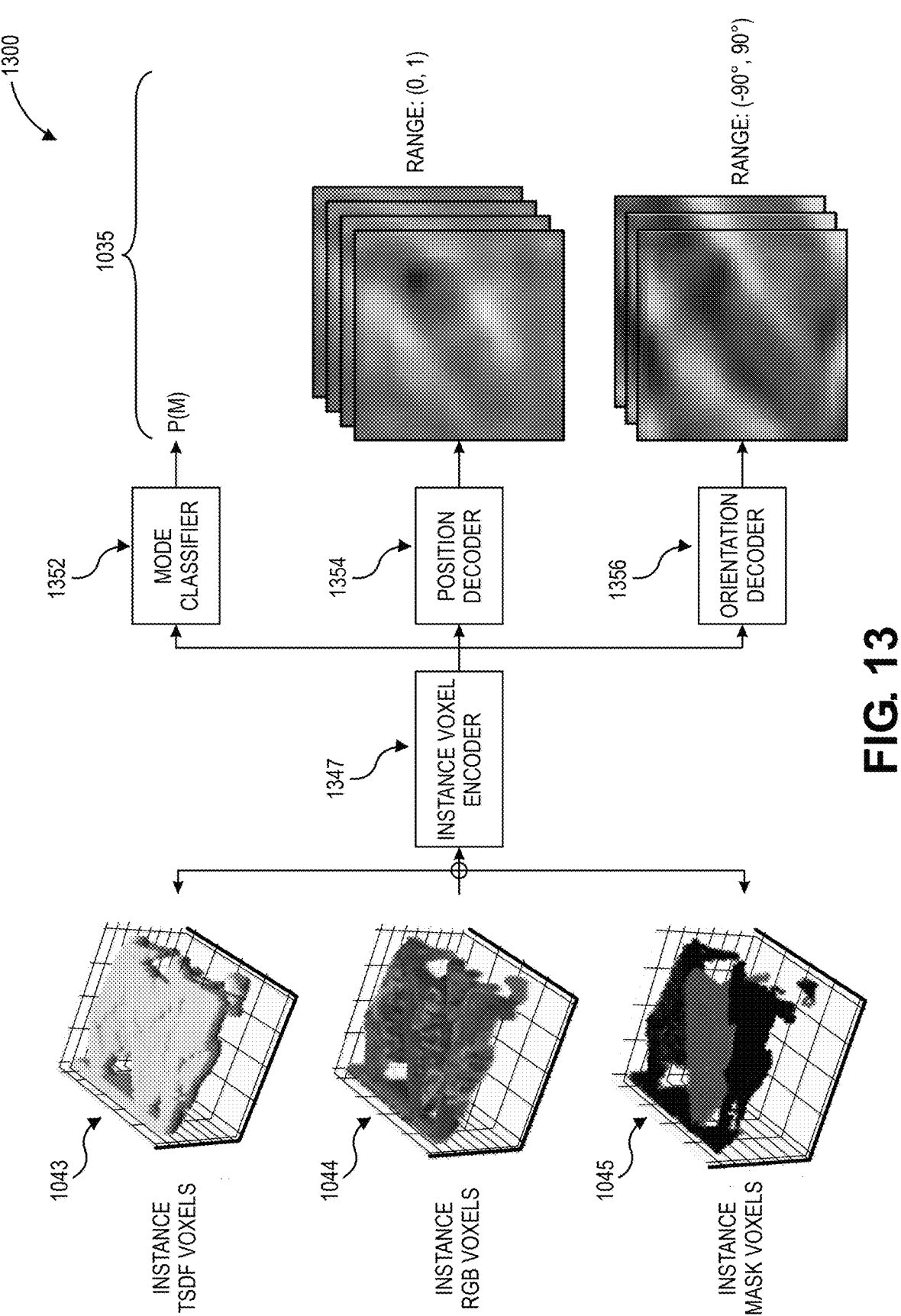
FIG. 13 is a schematic flow diagram of an example instance-wise, multi-modal, grasp generation using the learning module, in accordance with implementations of the present disclosure.

FIG. 13 is a schematic flow diagram 1300 of an example instance-wise, multi-modal, grasp generation using the learning module, in accordance with implementations of the present disclosure.

As shown in FIG. 13, in example embodiments, the TSDF voxels 1043, RGB voxels 1044, and instance mask voxels 1045 may be provided as inputs to the instance voxel encoder 1347. For example, the voxel representations 1043, 1044, 1045 may be concatenated and provided to the instance voxel encoder 1347.

The convolutional neural network 1050 may comprise an instance voxel encoder 1347 to process the voxel representations 1043, 1044, 1045 and extract or generate various three-dimensional features. In addition, the instance voxel encoder 1347 may encode or generate two-dimensional features based on the three-dimensional features. Various other processing of the voxel representations 1043, 1044, 1045 may be performed by the instance voxel encoder 1347 to encode or generate features to be used by portions of the instance-wise, multi-modal, grasp convolutional neural network 1050. Further details of the instance voxel encoder 1347 are shown and described at least with respect to FIGS. 14A-14B.

The convolutional neural network 1050 may further comprise three heads, models, or networks, including a mode classifier 1352, a position decoder 1354, and an orientation decoder 1356. The mode classifier 1352 may receive encoded features from the instance voxel encoder 1347, and may generate a probability distribution for a plurality of grasp modes. In the examples described herein, the plurality of grasp modes may comprise four grasp modes, including a flat mode, a full pinch mode, a small cup mode, and a parallel pinch mode, and the probability distribution may be generated with respect to the four grasp modes. As a result, the output of the mode classifier 1352 may have a dimension of 4 in the examples described herein.

The position decoder 1354 may also receive encoded features from the instance voxel encoder 1347, and may generate a plurality of position maps corresponding to respective ones of the plurality of grasp modes. The position maps may encode probabilities of individual pixels to be selected as grasp positions for particular grasp modes, in which brighter pixels may indicate a higher probability and darker pixels may indicate a lower probability. For example, one position map may be generated for each individual grasp mode. In the examples described herein, four position maps may be generated, in which one respective position map corresponds to each individual grasp mode of the four grasp modes. As a result, the output of the position decoder 1354 may have a dimension of (4, 40, 40) in the examples described herein.

The orientation decoder 1356 may further receive encoded features from the instance voxel encoder 1347, and may generate at least one orientation map as applicable or appropriate for individual ones of the plurality of grasp modes. The orientation map may encode orientation values associated with particular selected grasp positions and for applicable grasp modes, in which brighter pixels may indicate an orientation value that is rotated between 0 degrees and 90 degrees clockwise from a predetermined or designated orientation of 0 degrees, with a brightest pixel corresponding to 90 degrees, and in which darker pixels may indicate an orientation value that is rotated between 0 degrees and –90 degrees counterclockwise from a predetermined or designated orientation of 0 degrees, with a darkest pixel corresponding to –90 degrees. For example, an orientation map may be generated for one or more grasp modes and corresponding position maps, but the orientation map may not be applicable to one or more other grasp modes and corresponding position maps. In the examples described herein, one orientation map may be generated, in which the orientation map may correspond or be applicable to either the small cup mode or the parallel pinch mode of the four grasp modes. In more generalized examples described herein, the output of the orientation decoder 1356 may have a dimension of (3, 40, 40), including a respective orientation map for rotation around each of the x-, y-, and z-axes.

In the example embodiments of FIGS. 10-14B, the grasp orientation may generally correspond to an orientation around the z-axis, e.g., Oz which may be referred to as yaw, and the grasp orientation with respect to orientations around the x-axis and the y-axis may generally remain fixed or held, e.g., no changes to Ox or By which may be referred to as pitch or roll, respectively. Other example embodiments and various other grasp modes may include grasp orientations that include changes in orientation around two or more of the x-, y-, and z-axes, e.g., $\theta_X$, $\theta_Y$, and/or $\theta_Z$.

Further, for example embodiments in which grasp orientations may be determined around two or more of the x-, y-, and z-axes, respective orientation maps may be generated for each of the orientations around the x-, y-, and/or z-axes, e.g., a first orientation map for rotation around the x-axis, a second orientation map for rotation around the y-axis, and a third orientation map for rotation around the z-axis. In addition, each orientation map may encode orientation values for rotations around respective axes associated with particular selected grasp positions and for applicable grasp modes, in which the particular orientation values may be indicated by levels of brightness or darkness of associated pixels, as set forth above.

Based on the processing by the mode classifier 1352, the position decoder 1354, and the orientation decoder 1356, item grasping data 1035 may be selected or determined. For example, based on the probability distribution for a plurality of grasp modes generated by the mode classifier 1352, a grasp mode having the highest probability may be identified as the selected grasp mode.

In addition, based on the position maps generated by the position decoder 1354, a respective position map that corresponds to the selected grasp mode may be identified or selected. Then, a position with x- and y-coordinates having the highest probability, e.g., indicated by a brightest pixel, within the identified position map may be identified as the selected grasp position.

Further, based on the orientation map generated by the orientation decoder 1356, a pixel within the orientation map that corresponds to the pixel of the selected grasp position from the position map may be identified or selected. Then, an orientation or angular value relative to a predetermined or designated orientation of 0 degrees, e.g., indicated by relative brightness or darkness of the identified pixel, at the selected grasp position may be identified as the selected grasp orientation.

Figure 14A:
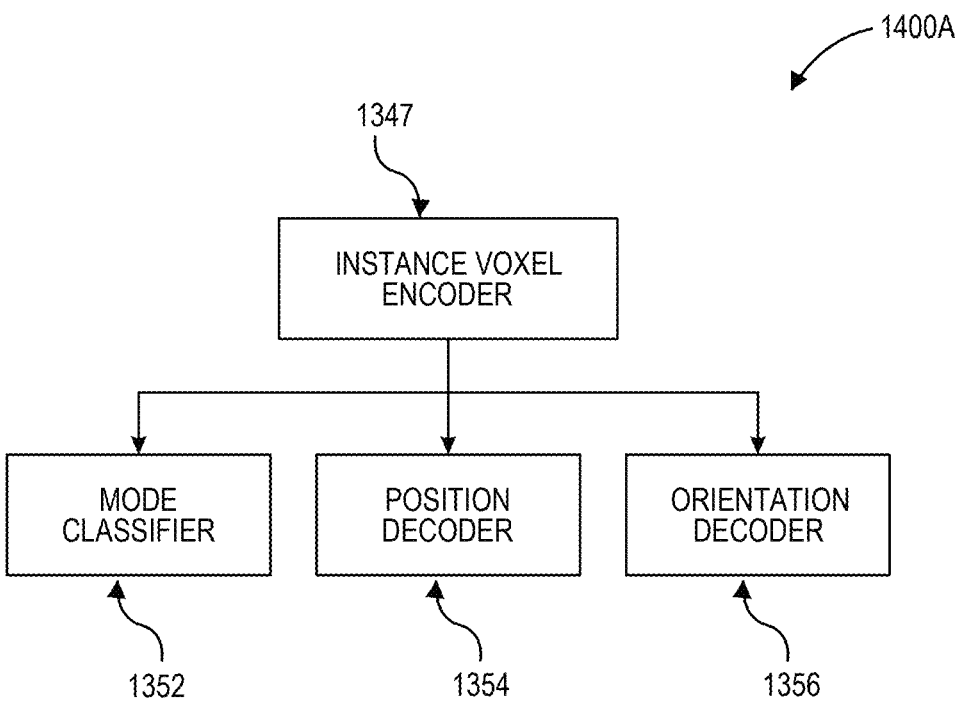
FIG. 14A is a schematic flow diagram of an example learning module for instance-wise, multi-modal, grasp generation, in accordance with implementations of the present disclosure.
Figure 14B:
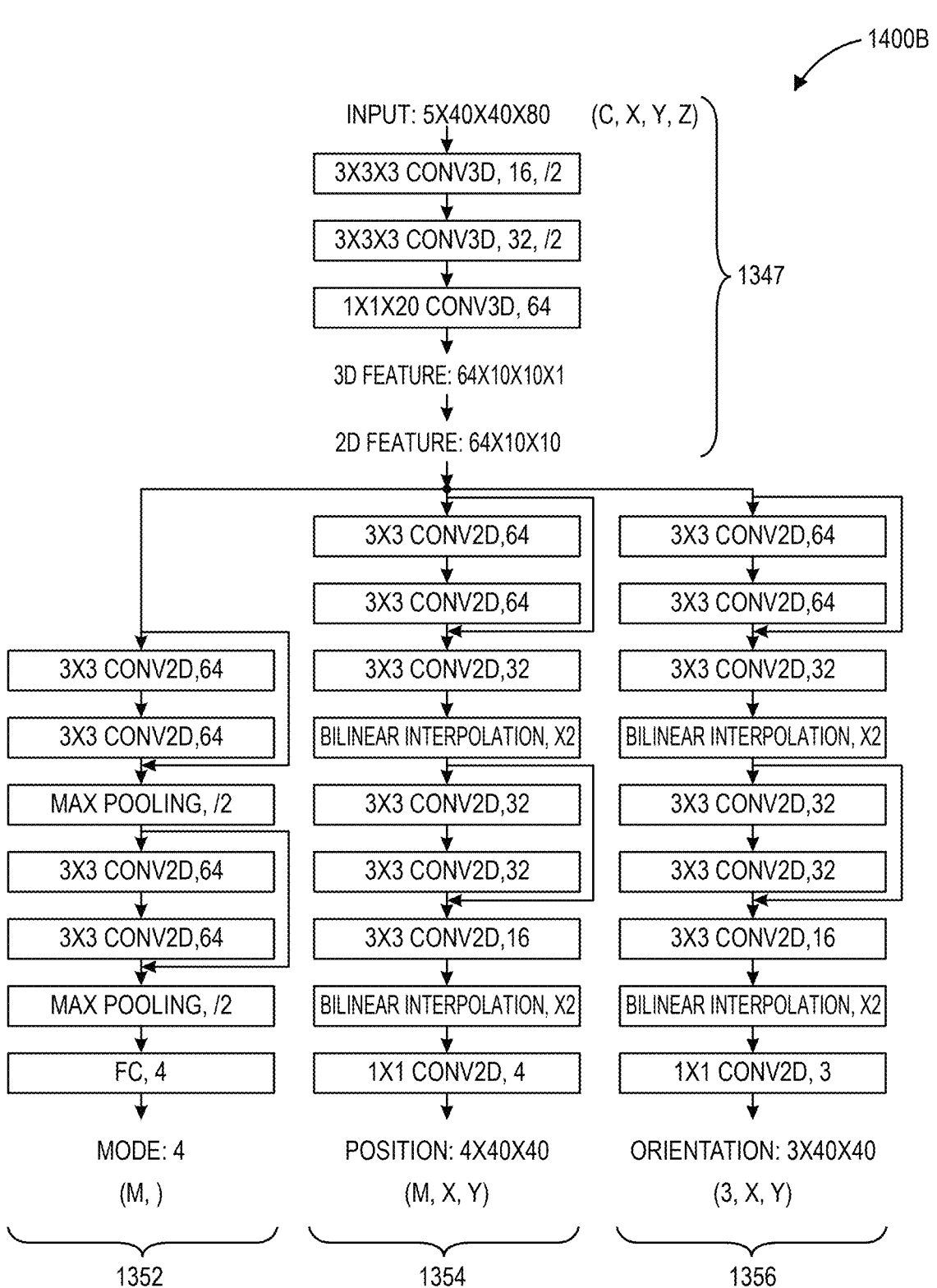
FIG. 14B is a detailed, schematic flow diagram of an example learning module for instance-wise, multi-modal, grasp generation, in accordance with implementations of the present disclosure.

FIG. 14A is a schematic flow diagram 1400A of an example learning module for instance-wise, multi-modal, grasp generation, in accordance with implementations of the present disclosure, and FIG. 14B is a detailed, schematic flow diagram 1400B of an example learning module for instance-wise, multi-modal, grasp generation, in accordance with implementations of the present disclosure.

As shown in FIGS. 14A and 14B, the instance voxel encoder 1347, mode classifier 1352, position decoder 1354, and orientation decoder 1356 may be trained using various machine learning or convolutional neural network training methods. In one example, the instance voxel encoder 1347 and mode classifier 1352 may be initially trained, in order to generate a selected grasp mode as output based on various voxel representations provided as input. Then, the instance voxel encoder 1347 and mode classifier 1352 may be frozen, and the position decoder 1354 may be trained using selected grasp modes generated by the mode classifier 1352 to find corresponding position maps for loss computation. Then, the position decoder 1354 may also be frozen together with the instance voxel encoder 1347 and the mode classifier 1352, and the orientation decoder 1356 may be trained using selected position maps generated by the position decoder 1354 to find corresponding pixels in one or more orientation maps for loss computation. In this manner, the instance voxel encoder 1347, mode classifier 1352, position decoder 1354, and orientation decoder 1356 may be trained to accurately and reliably generate item grasping data 1035, including a selected grasp mode, a selected grasp position, and/or a selected grasp orientation.

As further shown in FIG. 14B, the instance voxel encoder 1347, mode classifier 1352, position decoder 1354, and orientation decoder 1356 may comprise heads, models, networks, or portions of the instance-wise, multi-modal, grasp convolutional neural network 1050.

For example, the instance voxel encoder 1347 may receive the voxel representations 1043, 1044, 1045 as input, and may process the voxel representations 1043, 1044, 1045 via various convolutional layers to extract or generate various three-dimensional features. In addition, the instance voxel encoder 1347 may encode or generate two-dimensional features based on the three-dimensional features. Various other processing of the voxel representations 1043, 1044, 1045 may be performed by the instance voxel encoder 1347 to encode or generate features to be used by additional heads, models, networks, or portions of the convolutional neural network 1050.

In addition, the mode classifier 1352 may receive various encoded features from the instance voxel encoder 1347, and may process the encoded features via various convolutional layers to generate an output. As described herein, the output may comprise a probability distribution associated with a plurality of grasp modes. In the examples described herein, the plurality of grasp modes may comprise four grasp modes, and therefore, the output may have a dimension of 4.

Further, the position decoder 1354 may also receive encoded features from the instance voxel encoder 1347, and may process the encoded features via various convolutional layers to generate an output. As described herein, the output may comprise a plurality of position maps corresponding to respective ones of the plurality of grasp modes, and the position maps may encode probabilities of individual pixels to be selected as grasp positions for particular grasp modes, in which brighter pixels may indicate a higher probability and darker pixels may indicate a lower probability. In the examples described herein, four position maps may be generated, and therefore, the output may have a dimension of (4, 40, 40).

Moreover, the orientation decoder 1356 may further receive encoded features from the instance voxel encoder 1347, and may process the encoded features via various convolutional layers to generate an output. As described herein, the output may comprise at least one orientation map as applicable or appropriate for individual ones of the plurality of grasp modes, and the orientation map may encode orientation values associated with particular selected grasp positions and for applicable grasp modes, in which brighter pixels may indicate an orientation value that is rotated between 0 degrees and 90 degrees clockwise from a predetermined or designated orientation of 0 degrees, with a brightest pixel corresponding to 90 degrees, and in which darker pixels may indicate an orientation value that is rotated between 0 degrees and −90 degrees counterclockwise from a predetermined or designated orientation of 0 degrees, with a darkest pixel corresponding to −90 degrees. In the more generalized examples described herein, three orientation maps may be generated, e.g., a respective orientation map for rotation around each of the x-, y-, and z-axes, and therefore, the output may have a dimension of (3, 40, 40).

In the example embodiment of FIGS. 10-14B, the grasp orientation may generally correspond to an orientation around the z-axis, e.g., Oz which may be referred to as yaw, and the grasp orientation with respect to orientations around the x-axis and the y-axis may generally remain fixed or held, e.g., no changes to Ox or By which may be referred to as pitch or roll, respectively. Other example embodiments and various other grasp modes may include grasp orientations that include changes in orientation around two or more of the x-, y-, and z-axes, e.g., $\theta_X$, $\theta_Y$, and/or $\theta_Z$.

Using the learning modules described herein, item grasping data may be generated based on imaging data and depth data of one or more items to be picked/grasped. The item grasping data may comprise a grasp mode, a grasp position, and/or a grasp orientation. Further, robotic arms or other automated machines, systems, or devices having associated end effectors may utilize the item grasping data to reliably and efficiently pick/grasp single items or instances to facilitate various material handling processes.

In further example embodiments, portions of the item grasping data may be generated using the heuristic modules and/or modified heuristic modules described herein, and other portions of the item grasping data may be generated using the learning modules described herein. In one example implementation, a grasp mode may be generated or selected using the learning modules, and then, based at least in part on the selected grasp mode, a grasp position and/or grasp orientation may be generated or selected using the heuristic modules and/or modified heuristic modules. Various other combinations of the heuristic modules, modified heuristic modules, and/or learning modules described herein may be used to generate various portions of the item grasping data for individual items.

Figure 15:
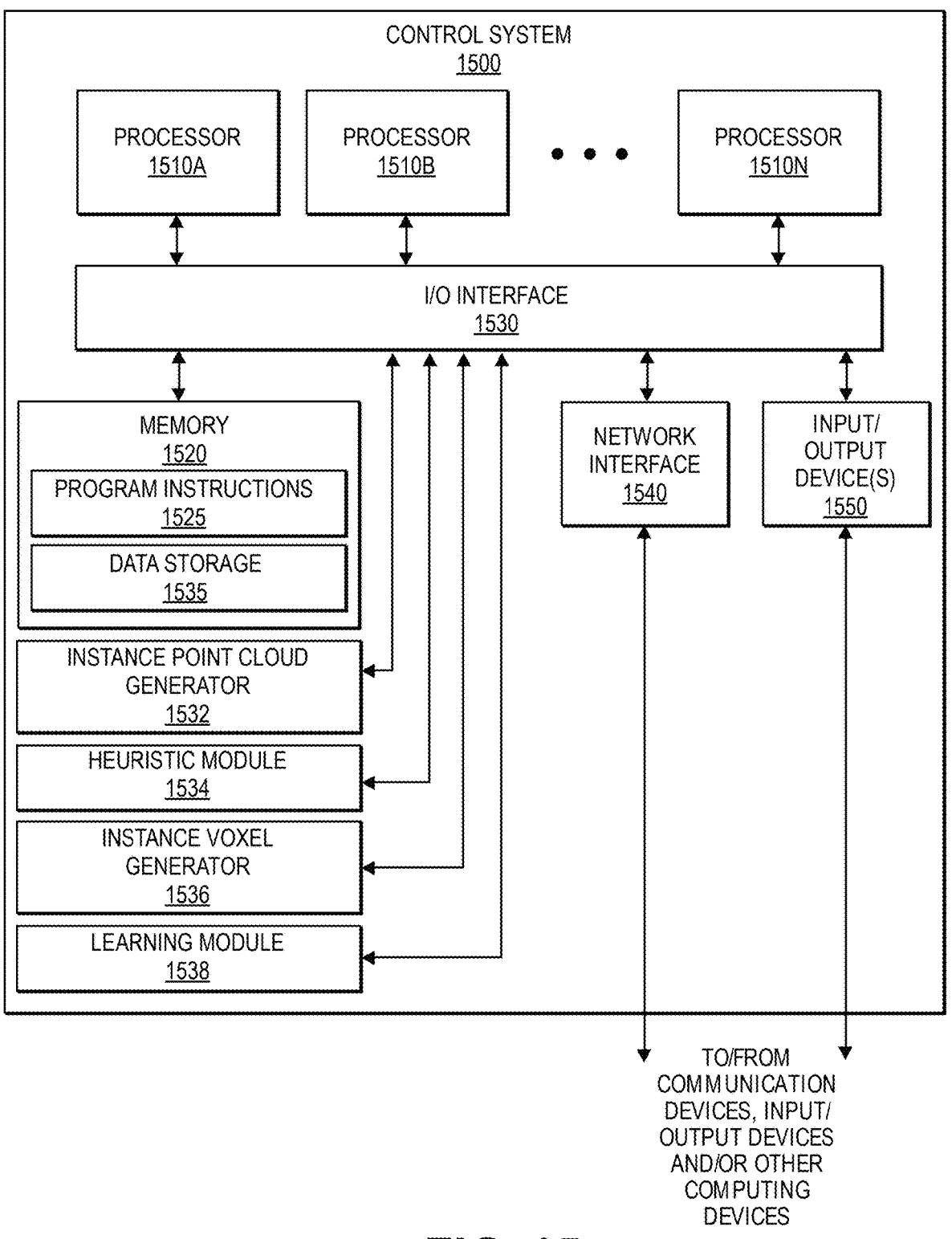
FIG. 15 is a block diagram illustrating various components of an example control system, in accordance with implementations of the present disclosure.

FIG. 15 is a block diagram illustrating various components of an example control system 1500, in accordance with implementations of the present disclosure.

Various operations of a control system or controller, such as those described herein, may be executed on one or more computer systems, and/or interacting with various other computers, systems, or devices in a material handling facility, according to various implementations. For example, the control system or controller discussed above may function and operate on one or more computer systems. In the illustrated implementation, a control system 1500 includes one or more processors 1510A, 1510B through 1510N, coupled to a non-transitory computer-readable storage medium 1520 via an input/output (I/O) interface 1530. The control system 1500 further includes a network interface 1540 coupled to the I/O interface 1530, and one or more input/output devices 1550. In some implementations, it is contemplated that a described implementation may be implemented using a single instance of the control system 1500 while, in other implementations, multiple such systems or multiple nodes making up the control system 1500 may be configured to host different portions or instances of the described implementations. For example, in one implementation, some data sources or services (e.g., related to portions of instance-wise, multi-modal, grasp generation systems, operations, or processes, etc.) may be implemented via one or more nodes of the control system 1500 that are distinct from those nodes implementing other data sources or services (e.g., related to other portions of instance-wise, multi-modal, grasp generation systems, operations, or processes, etc.).

In various implementations, the control system 1500 may be a uniprocessor system including one processor 1510A, or a multiprocessor system including several processors 1510A-1510N (e.g., two, four, eight, or another suitable number). The processors 1510A-1510N may be any suitable processor capable of executing instructions. For example, in various implementations, the processors 1510A-1510N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1510A-1510N may commonly, but not necessarily, implement the same ISA.

The non-transitory computer-readable storage medium 1520 may be configured to store executable instructions and/or data accessible by the one or more processors 1510A-1510N. In various implementations, the non-transitory computer-readable storage medium 1520 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1520 as program instructions 1525 and data storage 1535, respectively. In other implementations, program instructions and/or data may be received, sent or stored upon different types of computer-accessible media, such as non-transitory media, or on similar media separate from the non-transitory computer-readable storage medium 1520 or the control system 1500. Generally speaking, a non-transitory, computer-readable storage medium may include storage media or memory media such as magnetic or optical media, e.g., disk or CD/DVD-ROM, coupled to the control system 1500 via the I/O interface 1530. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1540.

In one implementation, the I/O interface 1530 may be configured to coordinate I/O traffic between the processors 1510A-1510N, the non-transitory computer-readable storage medium 1520, and any peripheral devices, including the network interface 1540 or other peripheral interfaces, such as input/output devices 1550. In some implementations, the I/O interface 1530 may perform any necessary protocol, timing or other data transformations to convert data signals from one component (e.g., non-transitory computer-readable storage medium 1520) into a format suitable for use by another component (e.g., processors 1510A-1510N). In some implementations, the I/O interface 1530 may include support for devices attached through various types of peripheral buses, such as a variant of the Peripheral Component Interconnect (PCI) bus standard or the Universal Serial Bus (USB) standard, for example. In some implementations, the function of the I/O interface 1530 may be split into two or more separate components, such as a north bridge and a south bridge, for example. Also, in some implementations, some or all of the functionality of the I/O interface 1530, such as an interface to the non-transitory computer-readable storage medium 1520, may be incorporated directly into the processors 1510A-1510N.

The network interface 1540 may be configured to allow data to be exchanged between the control system 1500 and other devices attached to a network, such as other control systems, material handling system controllers, warehouse management systems, other computer systems, robotic arms, machines, or systems, imaging devices, cameras, or sensors, depth or ranging sensors, various other types of sensors, other material handling systems, equipment, or processes, or between nodes of the control system 1500. In various implementations, the network interface 1540 may support communication via wired or wireless general data networks, such as any suitable type of Ethernet network.

Input/output devices 1550 may, in some implementations, include one or more displays, screens, monitors, projection devices, imaging sensors, cameras, other visual input/output devices, speakers, microphones, other audio input/output devices, keyboards, keypads, touchpads, scanning devices, sensors, photo eyes, proximity sensors, RFID readers, voice or optical recognition devices, or any other devices suitable for entering or retrieving data by one or more control systems 1500. Multiple input/output devices 1550 may be present in the control system 1500 or may be distributed on various nodes of the control system 1500. In some implementations, similar input/output devices may be separate from the control system 1500 and may interact with one or more nodes of the control system 1500 through a wired or wireless connection, such as over the network interface 1540.

As shown in FIG. 15, the memory 1520 may include program instructions 1525 that may be configured to implement one or more of the described implementations and/or provide data storage 1535, which may comprise various tables, data stores and/or other data structures accessible by the program instructions 1525. The program instructions 1525 may include various executable instructions, programs, or applications to facilitate item grasp generation operations and processes described herein, such as imaging device or depth sensor controllers, drivers, or applications, robotic arm, machine, or apparatus controllers, drivers, or applications, imaging and depth data processing controllers, drivers, or applications, isolated instance point cloud generator controllers, drivers, or applications, heuristic module controllers, drivers, or applications, instance voxel generator controllers, drivers, or applications, learning module controllers, drivers, or applications, material handling equipment controllers, drivers, or applications, etc. The data storage 1535 may include various data stores for maintaining data related to systems, operations, or processes described herein, such as imaging data, depth data, robotic arm data, end of arm tool data, picking area or container data, item data, segmentation mask data, cropped imaging and/or depth data, voxel data, instance data, plane segmentation data, fitted plane data, bounding box data, normal axis data, intersection line data, output data, grasp mode data, grasp position data, grasp orientation data, etc.

The control system 1500 may also include an instance point cloud generator 1532, which may perform various operations, functions, or processes described herein at least with respect to FIG. 5. The control system 1500 may also include a heuristic module 1534, which may perform various operations, functions, or processes described herein at least with respect to FIGS. 3, 4, and 6-9. The control system 1500 may also include an instance voxel generator 1536, which may perform various operations, functions, or processes described herein at least with respect to FIGS. 11 and 12. The control system 1500 may also include a learning module 1538, which may perform various operations, functions, or processes described herein at least with respect to FIGS. 3, 10, and 13-14B.

Those skilled in the art will appreciate that the control system 1500 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 1500 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the schematic flow diagrams shown in FIGS. 3-14B, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An item grasp generation system, comprising:
a robotic arm having an associated end of arm tool;
an imaging device;
a depth sensor; and
a control system configured to at least:
    receive, from the imaging device, imaging data associated with at least one item;
    receive, from the depth sensor, depth data associated with the at least one item;
    process the imaging data and the depth data to generate at least one of an instance point cloud or instance voxels by at least:
        performing instance segmentation upon the imaging data to isolate the at least one item and generate an instance segmentation mask;
        overlaying and cropping the imaging data onto the depth data to generate cropped imaging and depth data; and
        overlaying the instance segmentation mask onto the cropped imaging and depth data to generate a cropped point cloud with instance mask;
        wherein the at least one of the instance point cloud or the instance voxels comprises at least one of the cropped imaging and depth data or the cropped point cloud with instance mask;
    at least one of:
    process the instance point cloud using a heuristic module; or
    process the instance voxels using a learning module;
        generate a grasp mode, a grasp position, and a grasp orientation for picking the at least one item based on the processing by at least one of the heuristic module or the learning module; and
        instruct the robotic arm having the associated end of arm tool to pick the at least one item using the grasp mode, the grasp position, and the grasp orientation;
        wherein the grasp mode comprises at least one of a flat mode, a full pinch mode, a parallel pinch mode, or a small cup mode.

2. The item grasp generation system of claim 1, wherein the imaging device is configured to capture imaging data comprising red-green-blue (RGB) imaging data associated with the at least one item.

3. The item grasp generation system of claim 1, wherein the depth sensor is configured to capture point cloud depth data associated with the at least one item.

4. The item grasp generation system of claim 1, wherein the end of arm tool comprises at least one of a grasping finger, a pinching portion, or a suction cup.

5. A method, comprising:

receiving, by a control system from an imaging device, imaging data associated with at least one item;

receiving, by the control system from a depth sensor, depth data associated with at least one item;

processing, by the control system, the imaging data and the depth data to generate instance data associated with a single item by at least:

performing instance segmentation upon the imaging data to isolate the single item and generate an instance segmentation mask;

overlaying and cropping the imaging data onto the depth data to generate cropped imaging and depth data; and overlaying the instance segmentation mask onto the cropped imaging and depth data to generate a cropped point cloud with instance mask;

wherein the instance data comprises at least one of the cropped imaging and depth data or the cropped point cloud with instance mask;

processing, by the control system, the instance data using at least one of a heuristic module or a learning module;

generating, by the control system, a grasp mode, a grasp position, and a grasp orientation for picking the single item based on the processing using at least one of the heuristic module or the learning module; and instructing, by the control system, a robotic arm having an associated end of arm tool to pick the single item using the grasp mode, the grasp position, and the grasp orientation;

wherein the grasp mode comprises at least one of a flat mode, a full pinch mode, a parallel pinch mode, or a small cup mode.

6. The method of claim 5, wherein processing the imaging data and the depth data further comprises:

overlaying the instance segmentation mask onto the depth data to generate an isolated instance point cloud;

wherein the instance data comprises the isolated instance point cloud.

7. The method of claim 5, wherein processing the instance data using the heuristic module further comprises:

performing plane segmentation upon the instance data to generate one or more planes associated with the single item; and for individual planes of the one or more planes:

determining a plane point cloud associated with the individual plane;

fitting a plane to the plane point cloud;

applying a minimum volume bounding box around the fitted plane; and determining an axis normal to the fitted plane.

8. The method of claim 7, wherein processing the instance data using the heuristic module further comprises:

determining that the axis substantially aligns with a z-axis of a global reference frame;

in response to determining that the axis substantially aligns with the z-axis:

determining x-y dimensions of the fitted plane within the minimum volume bounding box;

selecting the grasp mode of a flat mode, a full pinch mode, or a small cup mode based on the x-y dimensions;

selecting the grasp position at a center of the minimum volume bounding box; and selecting the grasp orientation based on the x-y dimensions.

9. The method of claim 7, wherein processing the instance data using the heuristic module further comprises:

determining that the axis does not substantially align with a z-axis of a global reference frame;

in response to determining that the axis does not substantially align with the z-axis:

determining an intersection line between the fitted plane and an upper bounding plane of the minimum volume bounding box;

selecting the grasp mode of a parallel pinch mode;

selecting the grasp position at a center of the intersection line; and selecting the grasp orientation based on a direction of the intersection line.

10. The method of claim 5, wherein processing the imaging data and the depth data further comprises:

generating truncated signed distance function (TSDF) voxels based on the instance data;

generating red-green-blue (RGB) voxels based on the instance data; and generating instance mask voxels based on the instance data.

11. The method of claim 10, wherein processing the imaging data and the depth data further comprises:

encoding the TSDF voxels, the RGB voxels, and the instance mask voxels for the single item as input to the learning module.

12. The method of claim 5, wherein the learning module comprises a mode classifier, a position decoder, and an orientation decoder.

13. The method of claim 12, wherein processing the instance data using the learning module further comprises:

generating, by the mode classifier, a probability distribution for a plurality of grasp modes;

generating, by the position decoder, a plurality of position maps corresponding to respective grasp modes of the plurality of grasp modes; and generating, by the orientation decoder, an orientation map corresponding to at least one grasp mode of the plurality of grasp modes.

14. The method of claim 13, wherein generating, by the control system, the grasp mode, the grasp position, and the grasp orientation for picking the single item further comprises:

selecting the grasp mode having a highest probability distribution among the plurality of grasp modes;

selecting the grasp position based on a respective position map corresponding to the selected grasp mode; and selecting the grasp orientation based on the orientation map corresponding to the selected grasp mode.

15. A method, comprising:

receiving, by a control system from an imaging device, imaging data associated with at least one item;

receiving, by the control system from a depth sensor, depth data associated with at least one item;

processing, by the control system, the imaging data and the depth data to generate instance data associated with a single item by at least:

performing instance segmentation upon the imaging data to isolate the single item and generate an instance segmentation mask;

overlaying and cropping the imaging data onto the depth data to generate cropped imaging and depth data; and overlaying the instance segmentation mask onto the cropped imaging and depth data to generate a cropped point cloud with instance mask;

wherein the instance data comprises at least one of the cropped imaging and depth data or the cropped point cloud with instance mask;

processing, by the control system, the instance data using a learning module;

generating, by the control system, a first subset including at least one of a grasp mode, a grasp position, or a grasp orientation for picking the single item based on the processing using the learning module;

processing, by the control system, the instance data using a heuristic module based on the first subset;

generating, by the control system, a second subset including at least one of the grasp mode, the grasp position, or the grasp orientation for picking the single item based on the processing using the heuristic module and the first subset; and instructing, by the control system, a robotic arm having an associated end of arm tool to pick the single item using the grasp mode, the grasp position, and the grasp orientation;

wherein the grasp mode comprises at least one of a flat mode, a full pinch mode, a parallel pinch mode, or a small cup mode.

16. The method of claim 15, wherein the first subset generated using the learning module comprises the grasp mode for picking the single item.

17. The method of claim 15, wherein the second subset generated using the heuristic module comprises the grasp position and the grasp orientation for picking the single item.

* * * * *